US011908282B2

(12) United States Patent
Tran et al.

(10) Patent No.: US 11,908,282 B2
(45) **Date of Patent: *Feb. 20, 2024**

(54) GAMING DEVICE FOR AWARDING ADDITIONAL FEATURE GAME INSTANCES WITH CONTROLLED OVERSIZED SYMBOLS

(71) Applicant: Aristocrat Technologies Australia Pty Limited, North Ryde (AU)

(72) Inventors: Dinh Toan Tran, Wetherill Park (AU); Hanson Santoso, Kellyville (AU); Erika Degens, Epping (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/978,939

(22) Filed: Nov. 1, 2022

(65) Prior Publication Data

US 2023/0065209 A1 Mar. 2, 2023

Related U.S. Application Data

(63) Continuation of application No. 17/061,564, filed on Oct. 1, 2020, now Pat. No. 11,488,450.

(30) Foreign Application Priority Data

Oct. 2, 2019 (AU) ................................ 2019240642
Oct. 2, 2019 (AU) ................................ 2019240644

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3262* (2013.01); *G07F 17/34* (2013.01)

(58) Field of Classification Search
CPC .. G07F 17/3213; G07F 17/34; G07F 17/3267; G07F 17/3211; G07F 17/3244;
(Continued)

(56) References Cited

U.S. PATENT DOCUMENTS 6,186,894 B1 * 2/2001 Mayeroff ................ G07F 17/34
463/16
6,544,120 B2 4/2003 Ainsworth
(Continued)

FOREIGN PATENT DOCUMENTS

AU 2015230804 4/2016

OTHER PUBLICATIONS

Notice of Allowance dated Sep. 27, 2021 for U.S. Appl. No. 29/709,006 (pp. 1-9).
(Continued)

*Primary Examiner* — Justin L Myhr
(74) *Attorney, Agent, or Firm* — McAndrews, Held & Malloy, Ltd.

(57) ABSTRACT

A gaming device having a plurality of reel strips, each reel strip corresponding to a respective one of a plurality of columns of symbol positions. When the instructions are executed, the gaming device determines if a selection condition is met, randomly selects the number of game instances, randomly selects a subset of the columns of symbol positions to be populated by a defined symbol, randomly selects symbols to populate the columns of symbols not populated by the defined symbol, control the display to display the plurality of columns of symbol positions populated by the defined symbol and the symbols selected, and evaluates symbols displayed for winning combinations.

20 Claims, 34 Drawing Sheets

(58) Field of Classification Search
CPC ............... G07F 17/3258; G07F 17/326; G07F 17/3262; G07F 17/3265; G07F 17/3269; G07F 17/3288
See application file for complete search history.

(56) References Cited

U.S. PATENT DOCUMENTS

| | | | |
|---|---|---|---|
| D519,515 | S | 4/2006 | Mugura |
| D588,153 | S | 3/2009 | Okada |
| D622,283 | S | 8/2010 | Van Os |
| D664,992 | S | 8/2012 | Pizzutelli |
| D668,260 | S | 10/2012 | Arnold |
| D668,261 | S | 10/2012 | Arnold |
| D689,890 | S | 9/2013 | Fong |
| D699,744 | S | 2/2014 | Ho Kushner |
| 8,795,059 | B2 | 8/2014 | Aoki |
| 8,832,598 | B2 | 9/2014 | Hirata |
| D748,669 | S | 2/2016 | Vonshak |
| D760,275 | S | 6/2016 | Zhang |
| D764,523 | S | 8/2016 | Suki |
| D765,709 | S | 9/2016 | Gagnier |
| D772,242 | S | 11/2016 | Weskamp |
| D772,272 | S | 11/2016 | Lee |
| D772,920 | S | 11/2016 | Bauer |
| D776,694 | S | 1/2017 | Kim |
| D790,567 | S | 6/2017 | Su |
| 9,679,444 | B2 | 6/2017 | Ryan |
| D793,409 | S | 8/2017 | Berman |
| D813,881 | S | 3/2018 | Davis |
| D822,051 | S | 7/2018 | Omata |
| D839,305 | S | 1/2019 | Hawkins |
| D839,899 | S | 2/2019 | Suslik |
| D841,048 | S | 2/2019 | Penacho |
| D842,327 | S | 3/2019 | Suslik |
| D844,019 | S | 3/2019 | Keys |
| D846,586 | S | 4/2019 | Kim |
| D850,464 | S | 6/2019 | Satterlie |
| D858,557 | S | 9/2019 | Penacho |
| D874,519 | S | 2/2020 | Samuels |
| D877,185 | S | 3/2020 | Cooper |
| D892,837 | S | 8/2020 | Quick |
| D900,127 | S | 10/2020 | Visser |
| D915,433 | S | 4/2021 | Lamontagne |
| 11,017,569 | B2 | 5/2021 | Stewart |
| D923,041 | S | 6/2021 | Sepulveda |
| 11,055,893 | B2 | 7/2021 | Kolli |
| 11,068,153 | B2 | 7/2021 | Zambetti |
| D931,313 | S | 9/2021 | Upton |
| D938,440 | S | 12/2021 | Hawkins |
| D938,446 | S | 12/2021 | Hawkins |
| D939,564 | S | 12/2021 | Kwak |
| D952,646 | S | 5/2022 | Ludwick |
| D967,837 | S | 10/2022 | Boese |
| 11,488,448 | B2 | 11/2022 | Marks |
| D974,386 | S | 1/2023 | Pryor |
| D978,174 | S | 2/2023 | Marks |
| 2005/0070354 | A1 | 3/2005 | Baerlocher |
| 2006/0025201 | A1 | 2/2006 | Van Asdale |
| 2008/0132322 | A1 | 6/2008 | Yoshizawa |
| 2011/0201406 | A1 | 8/2011 | Jaffe |
| 2013/0102375 | A1 | 4/2013 | Aoki |
| 2014/0087830 | A1 | 3/2014 | Gobe |
| 2014/0162754 | A1 | 6/2014 | Tylman |
| 2014/0274282 | A1 | 9/2014 | Mastropietro |
| 2015/0018070 | A1 | 1/2015 | Meyer |
| 2015/0229987 | A1 | 8/2015 | Kim |
| 2016/0035181 | A1 | 2/2016 | Caputo |
| 2016/0078714 | A1 | 3/2016 | Gilmore |
| 2016/0093147 | A1 | 3/2016 | Penacho |
| 2017/0301177 | A1 | 10/2017 | Pawloski |
| 2019/0073858 | A1 | 3/2019 | Penacho |
| 2020/0265680 | A1 | 8/2020 | Chan |
| 2021/0312756 | A1 | 10/2021 | Penacho |
| 2022/0189239 | A1 | 6/2022 | Kojima |

OTHER PUBLICATIONS

"Best New Slots of January 2019" Feb. 13, 2019, You Tube, site visited Sep. 14, 2021: https://www.youtube.com/watch?v=EFrLd7Eta7M (Year: 2019).
"Friday take off! Matching all subs while playing high stakes volatile machines!!" May 24, 2019, You Tube, site visited Sep. 14, 2021: https://www.youtube.com/watch?v=i4r2NibWqFw (Year: 2019).
Gems Gems Gems slot machine, DBG Dec. 3, 2015, You Tube, site visited Sep. 14, 2021 : https://www.youtube.com/ (Year: 2015).
Notice of Allowance dated May 25, 2021 for U.S. Appl. No. 29/698,824 (pp. 1-6).
Office Action dated Sep. 21, 2021 for U.S. Appl. No. 17/061,564 (pp. 1-13).
Office Action (Final Rejection) dated Mar. 4, 2022 for U.S. Appl. No. 17/061,564 (pp. 1-13).
Office Action (Notice of Allowance and Fees Due (PTOL-85)) dated Jun. 27, 2022 for U.S. Appl. No. 17/061,564 (pp. 1-8).
Notice of Allowance dated Mar. 31, 2023 for U.S. Appl. No. 29/808,519 (pp. 1-9).

* cited by examiner

300

| | Reel strip position | Reel 1 (341) | Reel 2 (342) | Reel 3 (343) | Reel 4 (344) | Reel 5 (345) |
|---|---|---|---|---|---|---|
| 301 | 1 | Pic 1 | 10 | Pic 2 | Q | Pic 1 |
| 302 | 2 | Pic 1 | Q | Pic 2 | A | 10 |
| 303 | 3 | Pic 1 | K | Pic 2 | 10 | A |
| 304 | 4 | Pic 1 | Pic 1 | Pic 2 | Special Wild | Wild |
| 305 | 5 | Q | A | Q | Pic 2 | Pic 2 |
| 306 | 6 | 10 | Pic 2 | K | J | A |
| 307 | 7 | Q | Pic 2 | K | Pic 1 | Q |
| 308 | 8 | Pic 2 | Pic 2 | Wild | K | Pic 3 |
| 309 | 9 | A | Pic 2 | 10 | Q | 9 |
| 310 | 10 | 9 | Pic 2 | Pic 1 | K | J |
| 311 | 11 | Pic 2 | Pic 5 | 9 | Pic 5 | A |
| 312 | 12 | 10 | 9 | Pic 5 | Pic 5 | K |
| 313 | 13 | Pic 1 | K | A | Pic 5 | K |
| 314 | 14 | Pic 3 | 9 | Q | Pic 5 | Pic 4 |
| 315 | 15 | K | Special Wild | J | Pic 2 | 9 |
| 316 | 16 | K | 10 | 10 | 9 | Special Wild |
| 317 | 17 | J | Wild | 10 | A | K |
| 318 | 18 | Pic 4 | Pic 2 | Special Wild | A | Pic 1 |
| 319 | 19 | Pic 4 | Q | Pic 2 | 10 | Pic 1 |
| 320 | 20 | Pic 4 | J | J | K | 10 |
| 321 | 21 | Pic 4 | Pic 3 | Pic 3 | Pic 3 | K |
| 322 | 22 | J | Pic 3 | Pic 4 | Pic 4 | Pic 2 |
| 323 | 23 | Pic 3 | Pic 3 | K | 10 | Q |
| 324 | 24 | 9 | Pic 3 | 10 | J | Pic 4 |
| 325 | 25 | Pic 5 | Pic 3 | Pic 3 | Pic 1 | Pic 4 |
| 326 | 26 | A | Pic 4 | Pic 3 | 9 | Pic 4 |
| 327 | 27 | 10 | Scat | Pic 3 | 10 | Pic 4 |
| 328 | 28 | Pic 4 | K | Pic 3 | Wild | 10 |
| 329 | 29 | 9 | 10 | J | Q | Pic 2 |
| 330 | 30 | Q | Q | Pic 4 | K | J |

354 → (reel 1, position 10)
351 → (reel 1, position 11)
352 → (reel 1, position 12)
353 → (reel 1, position 13)
331

*FIG. 3*

FIG. 8
800
GRAND
$15,000.00
MAJOR
$880.00
+ MAJOR BONUS
MINOR
$35.00
MINI
$12.51
88
814
813
812
711
Bet multiplier 1
CREDIT
30904
BET
88
WIN
0
1¢

FIG. 9
900
GRAND
$15,000.00
MAJOR
$880.00
+ MAJOR BONUS
MINOR
$35.00
MINI
$12.50
THRILL
KINGDOM
88
911
CREDIT
19912
BET
WIN
176
1c
611
612
920
613
614
615

FIG. 10
1000
GRAND
$15,000.00
MAJOR
$880.00
MINOR
$35.00
MINI
$12.50
88
FREE
GAME
CREDIT
19912
WIN
176
1011
1030

FIG. 11
1100
GRAND
$15,000.00
MAJOR
$880.00
+ MAJOR BONUS
MINOR
$35.00
MINI
$12.50
88
1111
CREDIT 19912
WIN 216
1150
1160

FIG. 12
GRAND
$15,000.00
MAJOR
$880.00
+ MAJOR BONUS
MINOR
$35.00
MINI
$12.50
+ MINI BONUS
88
Free game 2 of 9 - Bonus reels in play
CREDIT 19912
WIN 216

FIG. 13
1300
GRAND
$15,000.00
MAJOR
$880.00
MAJOR BONUS
MINOR
$35.00
MINI
$12.50
KINGDOM
88
FREE
GAME
Free game 2 of 9 - Bonus reels in play
CREDIT 19912
WIN 216
1311
1312

FIG. 14
1400
GRAND
$15,000.00
MAJOR
$880.00
+ MAJOR BONUS
MINOR
$35.00
MINI
$12.50
88
1450
CREDIT
WIN
216
1411
1420
1412

FIG. 15
GRAND
$15,000.00
MAJOR
$880.00
+ MAJOR BONUS
MINOR
$35.00
MINI
$12.50
88
CREDIT 19912
WIN 392

FIG. 16
GRAND
$15,000.00
MAJOR
$880.00
1600
+ MAJOR BONUS
MINOR
$35.00
MINI
$12.50
88
A
A
10
1630
1611
Free game 3 of 10 - Bonus reels in play
CREDIT 19912
BET 88
WIN 392
1620

FIG. 17
1700
GRAND
$15,000.00
MAJOR
$880.00
+ MAJOR BONUS
MINOR
$35.00
MINI
$12.50
88
A
10
FREE
GAME
K
Free game 3 of 10 - Bonus reels in play
CREDIT 19912
WIN 392
1711
1713

FIG. 18
1800
GRAND
$15,000.00
MAJOR
$880.00
+ MAJOR BONUS
MINOR
$35.00
MINI
$12.50
88
1850
CREDIT
19912
WIN
392
1811
1820
1813

*FIG. 19*
1900
GRAND
$15,000.00
MAJOR
$880.00
+ MAJOR BONUS
MINOR
$35.00
MINI
$12.50
88
Free game 3 of 11 - Bonus reels in play
CREDIT 19912
WIN 392
1911

*FIG. 20*
2000
GRAND
$15,000.00
MAJOR
$880.00
MAJOR BONUS
MINOR
$35.00
MINI
$12.50
88
Free game 4 of 11 - Bonus reels in play
CREDIT
WIN
1416
2011
2020

FIG. 21
GRAND
$15,000.00
MAJOR
$880.00
+ MAJOR BONUS
MINOR
$35.00
MINI
$12.50
88
CREDIT 19912
BET
WIN 4360

GAMING DEVICE FOR AWARDING ADDITIONAL FEATURE GAME INSTANCES WITH CONTROLLED OVERSIZED SYMBOLS

RELATED APPLICATIONS

The present application is a continuation of and claims priority to U.S. patent application Ser. No. 17/061,564, filed Oct. 1, 2020, issued on Nov. 1, 2022, as U.S. Pat. No. 11,488,450, and entitled "Gaming Device for Awarding Additional Feature Game Instances with Controlled Oversized Symbols" which claims priority to Australian Patent Application No. AU 2019240642, filed Oct. 2, 2019, entitled "Gaming Device with Controlled Additional Feature Games," Australian Patent Application No. AU 2019240644, filed Oct. 2, 2019, entitled "Gaming Device with Controlled Additional Feature Games," and is related to U.S. Design Application No. 29/709,006, filed Oct. 10, 2019, which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Example embodiments provide a gaming device, a method of operating a gaming device and a gaming system configured so that one or more additional game instances (e.g. free games) can be awarded during a series of game instances. The one or more additional game instances are awarded when a designated symbol (e.g. a wild symbol) lands. When a designated symbol lands the column of symbol positions in which it lands is set to be a defined symbol (e.g. an enlarged wild symbol) for the remainder of the game instances. This prevents a further designated symbol from landing in the same column during the remainder of the game instances and hence provides a cap on the number of additional game instance that can be awarded in conjunction with the benefit of having the enlarged wild symbol for the remainder of the game instances.

An example embodiment provides a gaming device comprising a display, a processor, and a memory storing (i) R reel strips for use when N game instances are awarded, the R reel strips comprising S reel strips each comprising at least one designated symbol, each of the R reel strips corresponding to a respective one of a plurality of columns of symbol positions, and (ii) instructions. When the instructions are executed by the processor, they cause the processor to responsive to an award condition being met, award the N game instances, and conduct the N game instances and any awarded additional game instances. The instructions also cause the processor to, in each game instance, selecting symbols from the R reel strips for display on the display in each column of symbol positions not populated by defined symbols, responsive to selecting a designated symbol for a column of symbol positions, setting all symbol positions of the column as populated by the defined symbol for the current game instance and each remaining game instance and awarding T additional game instances, whereby a maximum number of game instances is capped at N+(S*T) game instances, and evaluating the symbols of the current game instance for winning combinations.

Another example embodiment provides a method of operating a gaming device comprising a display, and a memory storing R reel strips for use when N game instances are awarded, the R reel strips comprising S reel strips each comprising at least one designated symbol, each of the R reel strips corresponding to a respective one of a plurality of columns of symbol positions. The method comprises responsive to an award condition being met, awarding the N game instances, and conducting the N game instances and any awarded additional game instances, by in each game instance, selecting symbols from the R reel strips for display on the display in each column of symbol positions not populated by defined symbols, responsive to selecting a designated symbol for a column of symbol positions, setting all symbol positions of the column as populated by the defined symbol for the current game instance and each remaining game instance and awarding T additional game instances, whereby a maximum number of game instances is capped at N+(S*T) game instances, and evaluating the symbols of the current game instance for winning combinations.

Another example embodiment provides a gaming system comprising one or more processor, and memory storing (i) R reel strips for use when N game instances are awarded, the R reel strips comprising S reel strips each comprising at least one designated symbol, each of the R reel strips corresponding to a respective one of a plurality of columns of symbol positions, and (ii) instructions. When the instructions are executed by the one or more processors, they cause the one or more processors to responsive to an award condition being met, award the N game instances, and conduct the N game instances and any awarded additional game instances. The instructions also cause the one or more processors to, in each game instance, selecting symbols from the R reel strips for display on the display in each column of symbol positions not populated by defined symbols, responsive to selecting a designated symbol for a column of symbol positions, setting all symbol positions of the column as populated by the defined symbol for the current game instance and each remaining game instance and awarding T additional game instances, whereby a maximum number of game instances is capped at N+(S*T) game instances, and evaluating the symbols of the current game instance for winning combinations.

Example embodiments provide a gaming device, a method of operating a gaming device and a gaming system configured so if a player chooses a mystery choice option in respect of a feature game, a number of game instances (e.g. free games) is randomly awarded from among a number of possible values. In each free game a random number (e.g. between 1 and 3) of columns of symbol positions are set to be a defined symbol (e.g. an enlarged wild symbol).

An example embodiment provides a gaming device comprising a display, a processor, and a memory storing data defining a plurality of reel strips, each reel strip corresponding to a respective one of a plurality of columns of symbol positions, and instructions. When the instructions are executed by the processor, they cause the processor to determine that a selection condition is met for selecting a number of game instances to be conducted, select the number of game instances by randomly selecting between a plurality of different numbers of game instances, and conduct each game instance of the selected number of game instances by selecting a subset of the columns of symbol positions to be populated by a defined symbol at least in part by randomly selecting a number of columns to be populated from among a plurality of different numbers of columns, selecting symbols to populate the subset of columns of symbols not populated by the defined symbol by randomly selecting symbols from each reel strip of the plurality of reel strips that correspond to an unpopulated column of symbol positions, controlling the display to display the plurality of columns of symbol positions populated by the defined symbol and the selected symbol, and evaluating the symbols that populate the plurality of columns of symbol positions for winning combinations.

Another example embodiment provides a method of operating a gaming device comprising a display, and a memory storing data defining a plurality of reel strips, each reel strip corresponding to a respective one of a plurality of columns of symbol positions. The method comprises determining that a selection condition is met for selecting a number of game instances to be conducted, selecting the number of game instances by randomly selecting between a plurality of different numbers of game instances, and conducting each game instance of the selected number of game instances by selecting a subset of the columns of symbol positions to be populated by a defined symbol at least in part by randomly selecting a number of columns to be populated from among a plurality of different numbers of columns, selecting symbols to populate the subset of columns of symbols not populated by the defined symbol by randomly selecting symbols from each reel strip of the plurality of reel strips that correspond to an unpopulated column of symbol positions, controlling the display to display the plurality of columns of symbol positions populated by the defined symbol and the selected symbol, and evaluating the symbols that populate the plurality of columns of symbol positions for winning combinations.

Another example embodiment provides a gaming system comprising one or more processor, and at least one memory storing (i) data defining a plurality of reel strips, each reel strip corresponding to a respective one of a plurality of columns of symbol positions, and (ii) instructions. When the instructions are executed by the one or more processors, they cause the one or more processors to determine that a selection condition is met for selecting a number of game instances to be conducted, select the number of game instances by randomly selecting between a plurality of different numbers of game instances, and conduct each game instance of the selected number of game instances by selecting a subset of the columns of symbol positions to be populated by a defined symbol at least in part by randomly selecting a number of columns to be populated from among a plurality of different numbers of columns, selecting symbols to populate the subset of columns of symbols not populated by the defined symbol by randomly selecting symbols from each reel strip of the plurality of reel strips that correspond to an unpopulated column of symbol positions, controlling the at least one display to display the plurality of columns of symbol positions populated by the defined symbol and the selected symbol, and evaluating the symbols that populate the plurality of columns of symbol positions for winning combinations.

BRIEF DESCRIPTION OF THE DRAWINGS

FIG. 3 illustrates an example reel strip layout.

DETAILED DESCRIPTION

Figure 1:
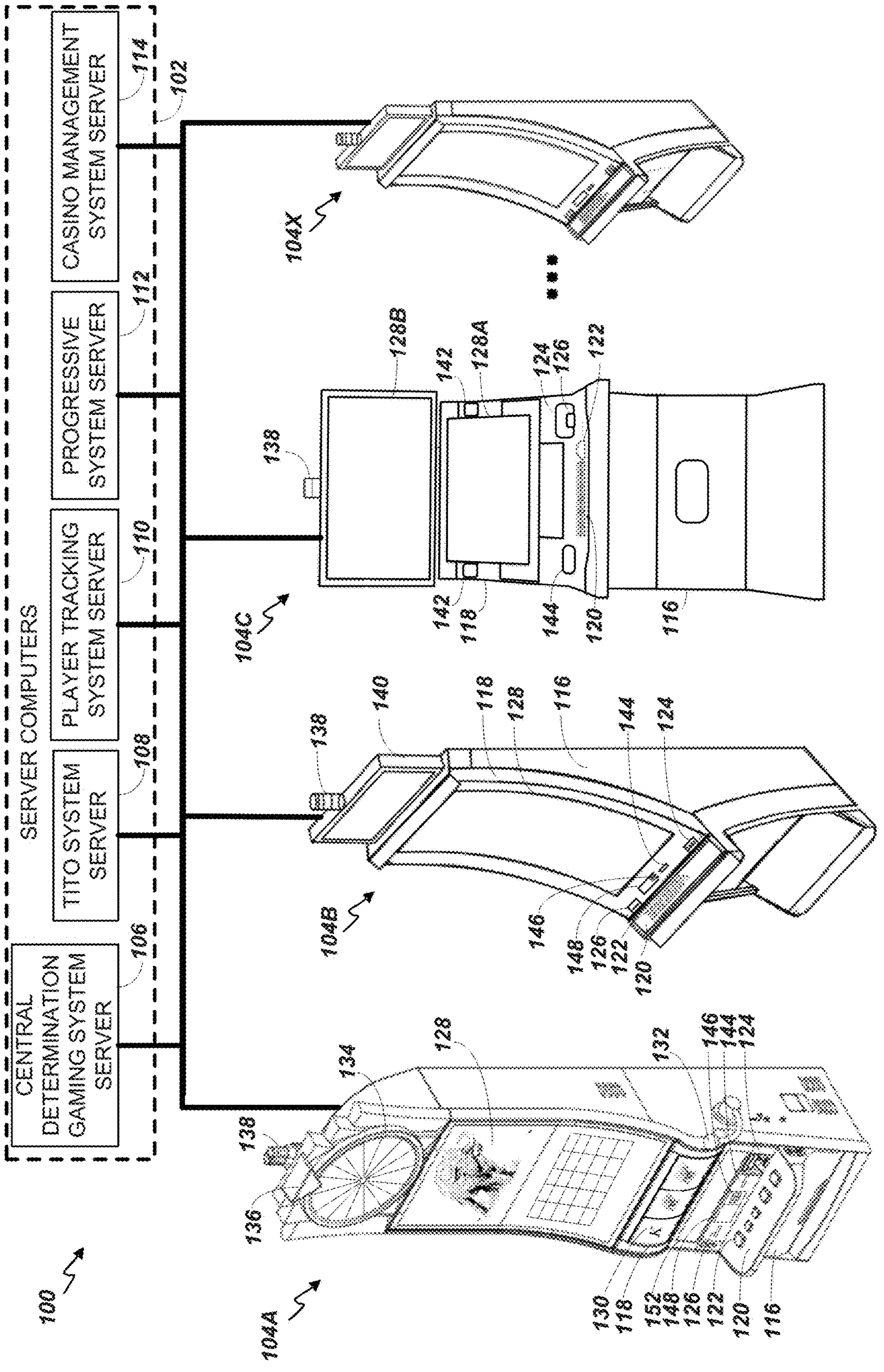
FIG. 1 is an exemplary diagram showing several EGMs networked with various gaming related servers.

Embodiments of the present disclosure represent a technical improvement in the art of electronic gaming machines, systems, and operating for such electronic gaming machines or systems. For example, at least some embodiments of the present disclosure provide additional functionality in an electronic gaming machine by employing a display that provides a visual transformation of game characteristics. In such embodiments, a subset of a plurality of columns of symbol positions is selected to be populated by a defined symbol, the defined symbol is visually oversized to occupy the subset for a current game and at least one subsequent game, and a plurality of symbols are selected to occupy display positions that are not occupied by an oversized defined symbol. When the oversized defined symbol and the other symbols are animated, the gaming machine evaluates the symbols displayed for an award.

By way of another example of technical improvements in the art of electronic gaming machines, systems provided by embodiments of the present disclosure, at least some embodiments of the present disclosure provide additional functionality in an electronic gaming machine by employing a display that provides a visual transformation of game characteristics. In such embodiments, a plurality of symbols are randomly selected for animated display at a plurality of symbol positions. When the plurality of symbols selected include a designated symbol, the gaming machine populates all symbol positions in one column of symbol positions with a defined symbol for aa current game instance and at least one remaining game instance, and awards one or more additional game instances while capping a total number of the one or more additional game instances to be awarded during the one or more game instances with the one or more game instances initially awarded, a number of reel strips having the designated symbol, and the one or more additional game instances awarded in the current game instance.

Further, the visual modification of game characteristics also provides an improved gaming mechanics such that the player may only need to focus on symbols being displayed, visually oversized, and strategically capped, without being overly burdened by complicated calculations. Further, embodiments of the present disclosure also provide an oversized animated symbol to illustrate certain game characteristic combinations that are not conventional, as those that utilize memory to store data for capping a number of columns to effect visualization of symbols, and for multiple columns to involve visual effect of a defined symbol, such that one or more of these multiple columns are used to effect game characteristics to be selected. Thus, embodiments of the present disclosure are not merely new game rules or simply new display patterns, but provide technologic improvements to game display in the art of electronic gaming machines and software for such electronic gaming machines. Moreover, the above example is not intended to be limiting, but merely exemplary of technologic improvements provided by some embodiments of the present disclosure. Technological improvements of other embodiments should be readily apparent to those of ordinary skill in the art in light of the present disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
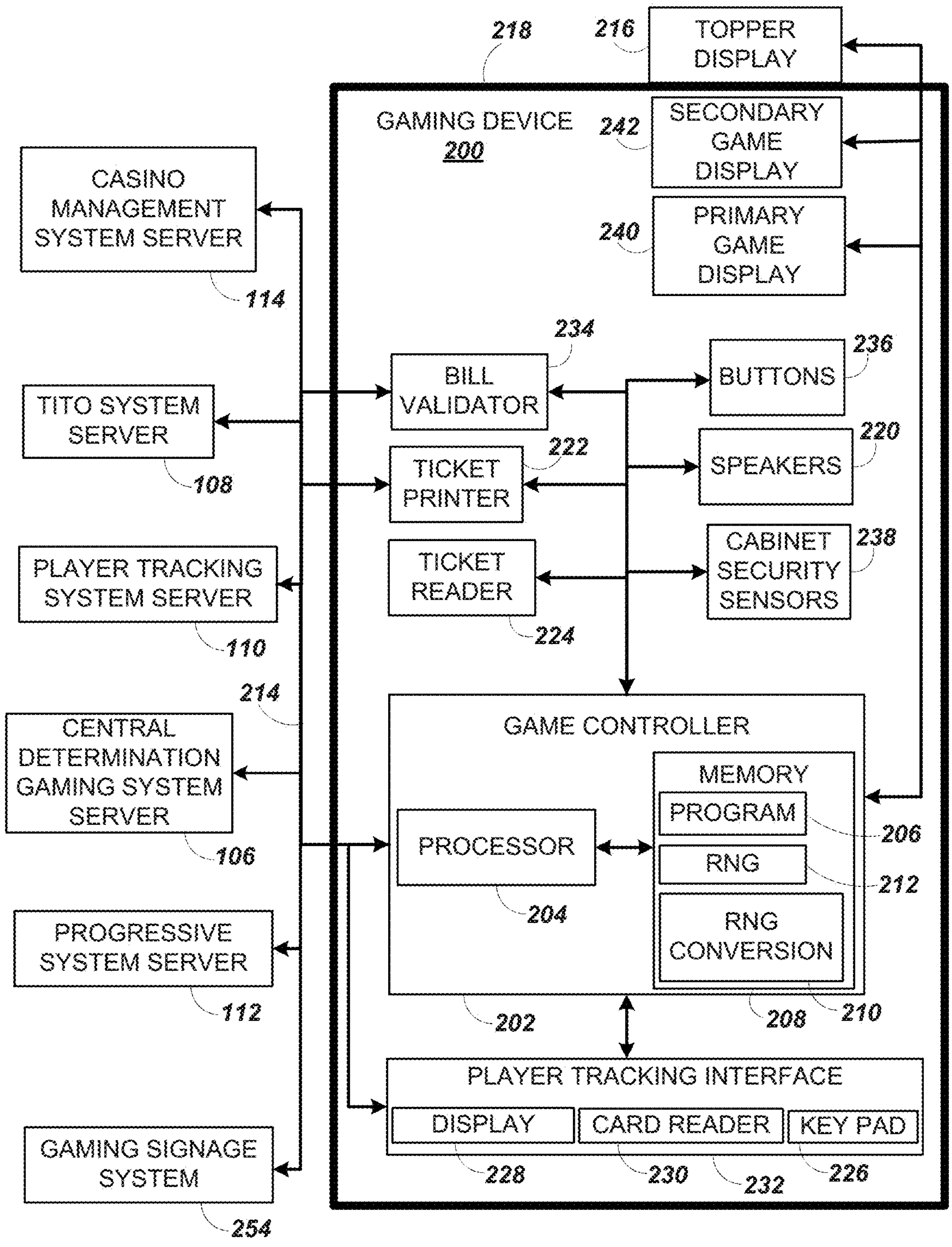
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other input device which enables a player to input information into the gaming device 200. In some embodiments, a player's selection may apply across a plurality of game instances. For example, if the player is awarded additional game instances in the form of free games, the player's prior selection of the amount bet per line and the number of lines played may apply to the free games. The selections available to a player will vary depending on the embodiment. For example, in some embodiments a number of pay lines may be fixed. In other embodiments, the available selections may include different numbers of ways to win instead of different numbers of pay lines.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
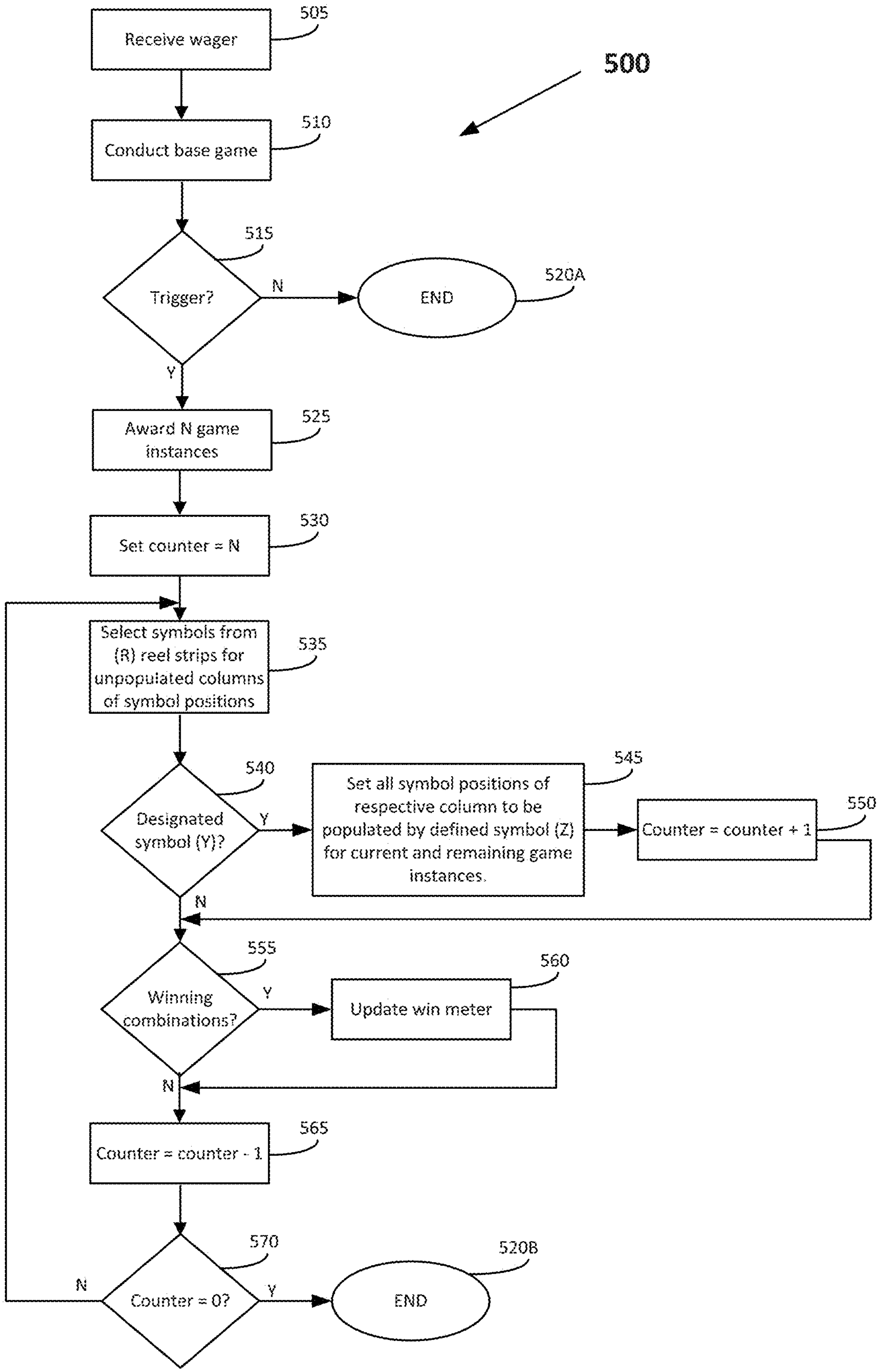
FIG. 5 is a flow chart of a method of operating a gaming device.

Referring to FIG. 5, there is shown an example method 500 of operating a gaming device. At step 505, the gaming device 200 receives a wager selection input by the player using one of the input devices described above.

At step 510, the processor 204 of the gaming device responds to initiation of a game by conducting a base game. To conduct the base game, the processor 204 selects symbols from a set of reel strips stored in memory 208 and evaluates the selected symbols for (i) winning combinations based on a pay table stored in memory 208; and (ii) any feature game trigger.

FIG. 3 illustrates an example of a set 300 of five reel strips 321, 322, 323, 324, 325. In the example, each reel strip has fifteen reel strip positions 301-315. Each reel strip position of each reel has a symbol. For example, a "Wild" symbol 331 occupies the sixth reel strip position 306 of the FIG. 3 illustrates an example of a set 300 of five reel strips 341, 342, 343, 344, 345. In the example, thirty reel strip positions 301-330 are shown for each reel strip (the actual reel strips are longer). Each reel strip position of each reel has a symbol. For example, a "Wild" symbol 331 occupies the twenty-eighth reel strip position 328 of the fourth reel 344. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual length of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
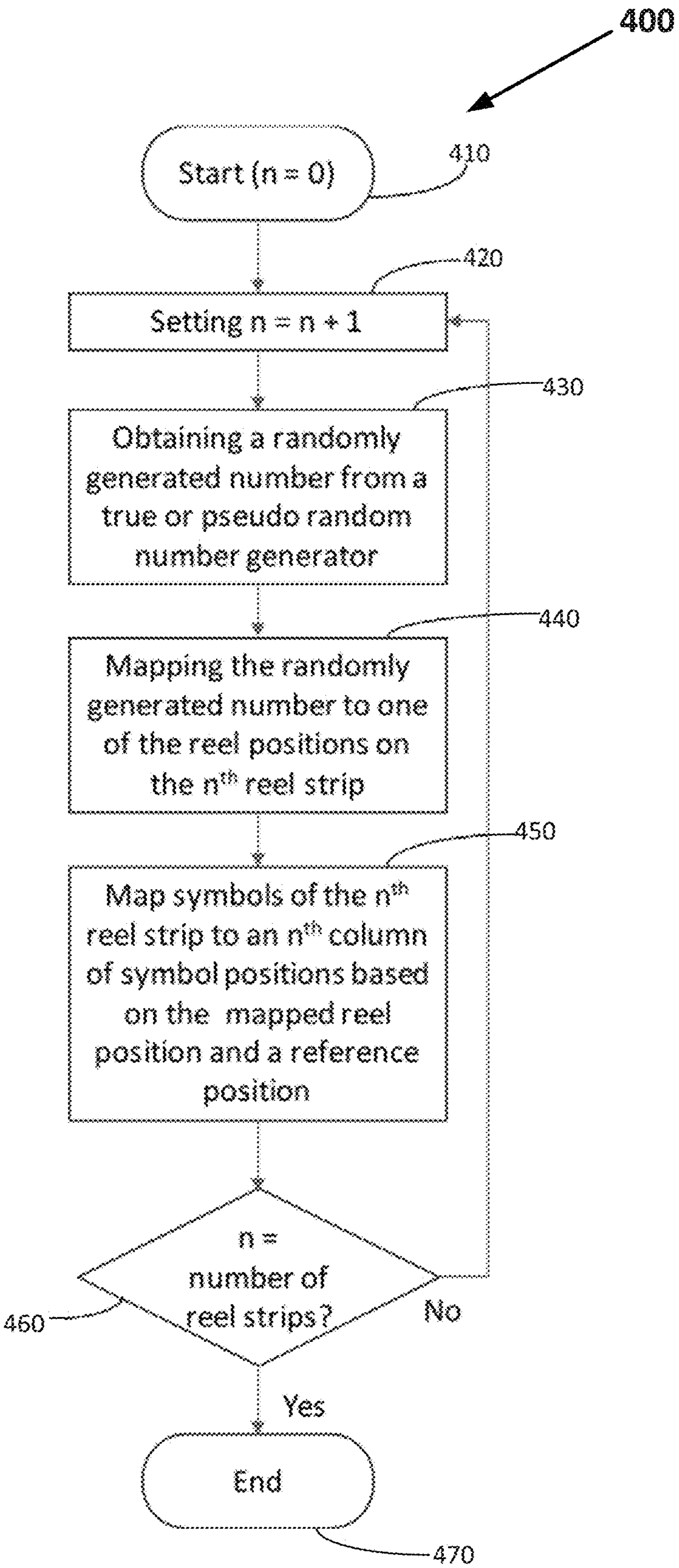
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430 the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are three other symbol positions in the column of symbol positions and hence symbols at three neighboring reel strip positions are also mapped to the symbol positions of the column. Referring to the example reel strips of FIG. 3, if the value returned by the RNG 212 is mapped to reel position 313, then for the first reel strip 321, "Pic 1" symbol 353 is mapped to a bottom symbol position, "10" symbol 352 is mapped to a the position immediately above the bottom position, "Pic 2" symbol 351 is mapped to the next position above, and the "9" symbol 354 is mapped to the top position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions. Processor 204 then evaluates the selected symbol for winning combinations and to determine whether a feature game has been triggered.

Figure 6:
FIGS. 6, 7, 8, 9, 10, 11, 12, 13, 14, 15, 16, 17, 18, 19, 20, and 21 are example screen displays during an example of operating the gaming device.

FIG. 6 is an example screen display 600 of a base game conducted in accordance with the embodiment. FIG. 6 shows that there are five columns 611-615 of symbol positions corresponding to respective ones of five reel strips. Each column 611-615 has four symbol positions, i.e. so that the symbol positions are also arranged in four rows 621-624. The screen display 600 also has an upper region where values of progressive jackpot prizes including Grand jackpot prize 641, progressive Major jackpot prize 642, progressive Minor jackpot prize 643, and progressive Mini jackpot prize 644 are displayed. Bet indicator 651 indicates that a player's selection has resulted in "5 Gold Stacks Active" 651*a*. In this example, the reel strips have stacks of symbols, e.g. a plurality of the same symbol at different positions such as the stack of "Pic 1" symbol in the first to fourth reel strip positions 301-304 of the first reel strip 341. A player can select which of the symbols in the stacks will be "gold" and hence have a higher pay table value than the normal version of those symbols.

In this example, while sharing a common visual theme, there are three different wild symbols employed in the reel strips for the base game to enable the wild symbols to a) have the usual function of a wild symbol of substituting for other symbols in winning combinations; b) enable the wild symbol to be the trigger symbol for the feature game; and c) enable an expansion of a wild symbol to occur without the expansion triggering the feature game.

Figure 7:
Figure 8:

FIGS. 6, 7 and 8 show examples of the three wild symbols 631, 711, 812-813 from which it will be apparent that each wild symbol has a common character in a central portion to indicate that each of them has a function of acting as a substitute symbol but is distinguished from one another by different borders, backgrounds, or clothing on the common character to indicate the differences in functionality. FIG. 6 shows an example of a normal WILD symbol 631 (or "normal" WILD). In an example, normal WILD symbol 631 has a red border 632. Normal WILD symbol 631 acts as the trigger symbol such that if three or more normal WILD symbols are selected by processor 204, processor 204 triggers a feature game at step 515.

FIG. 7 illustrates an example of a special WILD symbol 711 that is distinguishable from normal WILD symbol 631 by a gold border 712. When a special WILD symbol is selected by processor 204 for display (i.e. it "lands"), the processor 204 changes all other symbols in the column to wild symbols, in the example, having the potential effect of increasing the number of winning combinations that will be paid out. FIG. 8 shows an example of such a modification where, after special WILD symbol 711 lands in FIG. 7, WILD symbols 812-814 symbols replace the symbols at each other symbol position of column 614. However, while the WILD symbols 812-814 also have a gold border to indicate that they are linked to special WILD symbol 711, the WILD symbols 812-814 has a gold background and the common character wears gold clothing. The visual similarities of the wild symbols enable the player to understand that the wild symbols will perform the same function as a substitute symbol while also communicating a difference to normal WILD symbol 611 and hence to understand why the presence of four WILD symbols in the game outcome of FIG. 8 does not lead to the feature game being triggered by processor 204 at step 515 and the game is ended by processor 204 at step 520A.

If the processor 204, determines at step 515 that a trigger condition is met (e.g. 3 or more normal WILD symbols) the processor 204 proceeds to step 525 and awards N game instances. In some examples, the number of awarded game instances may be related to the number of trigger symbols in the scatter combination that triggered the feature game.

Figure 9:

FIG. 9 shows an example screen display during one implementation of the method of FIG. 5. In this example, N is 8, as shown in feature game progress message 920 which states that the gaming device 200 is carrying out "Free game 1 of 8". This message is a representation of a game instance counter set by processor 204 at step 530 in memory 208.

At step 535, the processor 204 selects symbols from the reel strips for unpopulated columns of symbol positions. In this respect, during conduct of the feature game, some of the columns can become populated by a defined symbol (in this example a wild symbol). Thus, "unpopulated columns" are columns that are not already occupied by a defined symbol. In the first game instance ("free game) none of the columns are populated by a wild symbol. Thus, from the example of screen display 900, it will be apparent that processor 204 has selected symbols from each of the 5 reel strips for display in the five columns 611-615 of symbol positions.

At step 540, the processor 204 determines whether the selected symbols include any designated symbols, in this example the special WILD symbol 911. As there is a special WILD symbol 911 in the game outcome shown in FIG. 9, the processor proceeds to step 545 and sets all symbol positions of the column to be populated by a defined symbol for the current game instance and all remaining game instances. In this example, the defined symbol is a wild symbol, however, in other examples, the defined and designated symbols can be different. At step 550, the processor 204 increments the game instance counter by 1.

Figure 10:
Figure 11:

Screen displays corresponding to steps 540 and 545 are shown in FIGS. 10 and 11. In FIG. 10, a first state of an oversized WILD symbol 1011 is shown as occupying all symbol positions of the second column 612 to indicate that all symbol positions of this column are to be treated as occupied by a wild symbol. A message "+1 Free Game" is superimposed on the oversized WILD symbol 1011 to indicate the award of an additional game instance. In FIG. 11, a second state of the oversized WILD symbol 1111 is shown and an updated feature game progress message 1150 indicates that this is now "Free game 1 of 9" due to the award of an additional free game at step 550. In other examples, more than one, e.g. 2 or 3, additional free games may be awarded at step 550.

At step 555, the processor 204 determines whether there are any winning combinations by comparing the displayed symbols (here as shown in FIG. 11) with the pay table in memory 208. If the processor 204 determines that there is one or more winning combinations, processor 204 updates win meter in memory 208 at step 560. Screen display 1100 includes a visual representation of the win meter 1160.

At step 565, the processor 204 decreases the game instance counter by one to reflect that this game instance has been completed. In this example, this is visually represented to the player by showing that the player has progressed to a further game instance by the updated free game progress message 1212 shown in FIG. 12. In other examples, the processor may maintain separate values of games conducted and total games in memory 208.

At step 570, the processor 204 determines whether the counter has reached zero (i.e. whether all the free games have been conducted). If not, processor reverts to step 535 and selects a further set of symbols for unpopulated columns of symbol positions, in this case for columns, 1, 3, 4 and 5. In this respect, processor 204 selects reel strips using the same method shown in FIG. 4 but modified so that each populated column is skipped. In one implementation, following step 420, the processor 204 determines whether the column is occupied by the defined symbol and, if the column is populated, reverts to step 420 rather than proceeding to step 430 so that the reel strip number is incremented again.

Figure 12:

FIGS. 12, 13, 14, 15, 16, 17, 18, 19, 20, and 21 show further iterations through steps 535-570. More specifically, FIG. 12 shows a screen display 1200 that in a second free game, the oversized WILD symbol is displayed in a fourth state 1211 and that a second special WILD symbol 1212 has landed, in this case on the third reel.

Figure 13:

FIG. 13 shows a screen display 1300 where the second special WILD symbol has been changed to a second oversized WILD symbol 1312 populating all symbol positions of the third column 613. Second oversized WILD symbol 1312 is shown in a first state with a message indicating the award of an additional free game (i.e. that game instance counter is incremented by one at step 550).

Figure 14:
Figure 15:

FIG. 14 contains an updated free game progress message 1420 that now indicates that "Free game 2 of 10" is in progress due to the added game instance. FIG. 14 also shows part of an animation in which first oversized symbol 1411 and second oversized symbol 1412 are combined into a single, larger oversized symbol occupying the second column 611 and third column 612 of symbol positions. In this respect, an animation effect of a falling pile of coins 1450 covers the first oversized symbol 1411 and second oversized symbol 1412 temporarily before a larger oversized symbol 1511 is revealed in FIG. 15. The larger oversized symbol 1511 makes it easier for the player to see which columns are occupied by WILD symbols.

Figure 16:

FIG. 16 is a screen display 1600 of the initial game outcome of a third free game of the series of game instances as indicated by updated free game progress message 1620: "Free game 3 of 10". Larger oversized symbol is shown in a second state 1611 and a further special WILD symbol 1630 has landed in the fourth column.

Figure 17:

Screen display 1700 of FIG. 17 shows that processor 204 responds to landing of the further special WILD symbol 1630 by changing all symbol positions of the fourth column to wild symbols and displaying a third oversized WILD symbol 1713 in a first state with a message indicating that a further free game will be added to the counter.

Figure 18:
Figure 19:
Figure 20:
Figure 21:

Screen display 1800 of FIG. 18 shows an updated free game progress message 1820 indicating that this is now "Free game 3 of 11". Further an animation 1850 of a further shower of gold coins has started which will, in this example, transform the larger oversized symbol 1811 and the third oversized symbol 1813 into a maximum sized oversized symbol 1911 as shown in screen display FIG. 19. In this respect, in this example, special WILD symbols are only found on reel strips 2, 3 and 4 corresponding to the second, third and fourth columns of symbol positions 612-614. As a result, in further game instances such as those shown in the screen displays 2000, 2100 of FIGS. 20 and 21, respectively, the number of remaining game instances can only decrease as shown by respective progress messages 2020, 2120.

In this respect, it will be observed that by configuring the gaming device so that the occurrence of the designated symbol is both the trigger for adding one or more additional game instances and the trigger for populating the column completely with a defined symbol, a mechanism is provided which allows additional game instances to be awarded while imposing a cap on the number of additional game instances that can be awarded.

That is, in the example arrangement where there are 3 reel strips that have the special WILD symbol then and one additional game instance is awarded, then the maximum number of game instances is the initial number of game instances plus three.

More generally, where N game instances are initially awarded, there are S reel strips that have the designated symbol, and T game instances are awarded each time the designated symbol lands, then the maximum number of game instances=N+(S*T).

In another embodiment, the landing of a designated symbol may result in an alternative or additional action such as the addition of one or more additional symbol positions to the rows and columns of symbol positions.

Figure 22A:
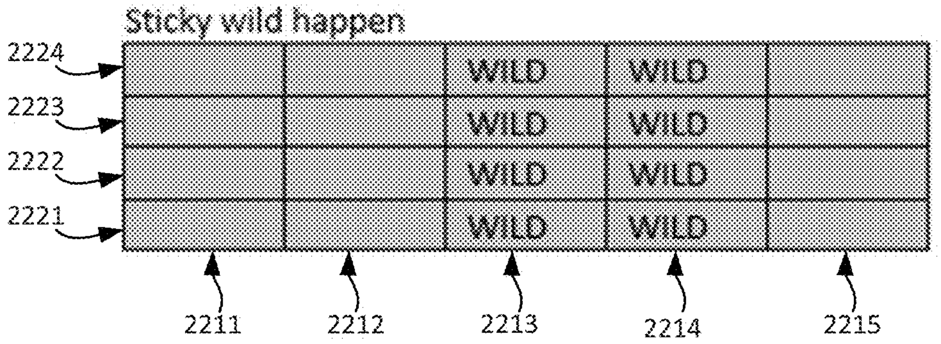
FIGS. 22A, 22B, and 22C illustrate examples of adding one or more symbol positions.
Figure 22B:
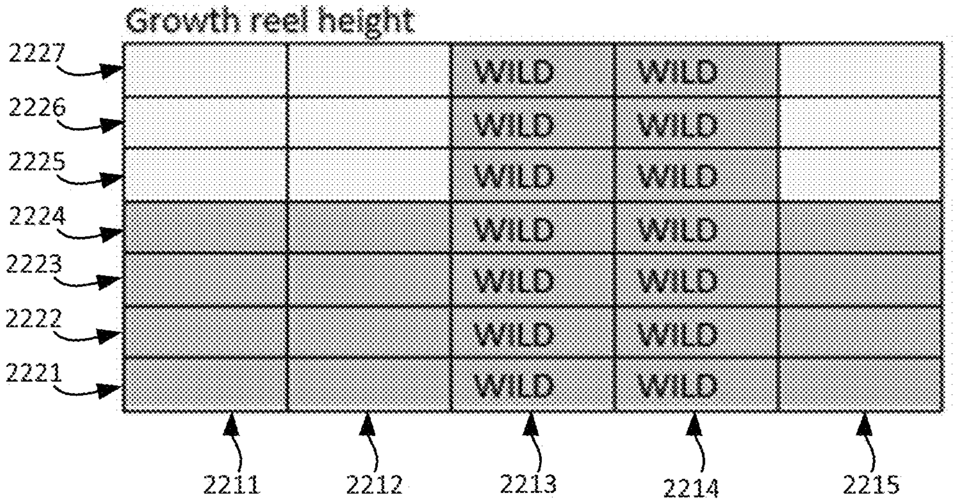
Figure 22C:
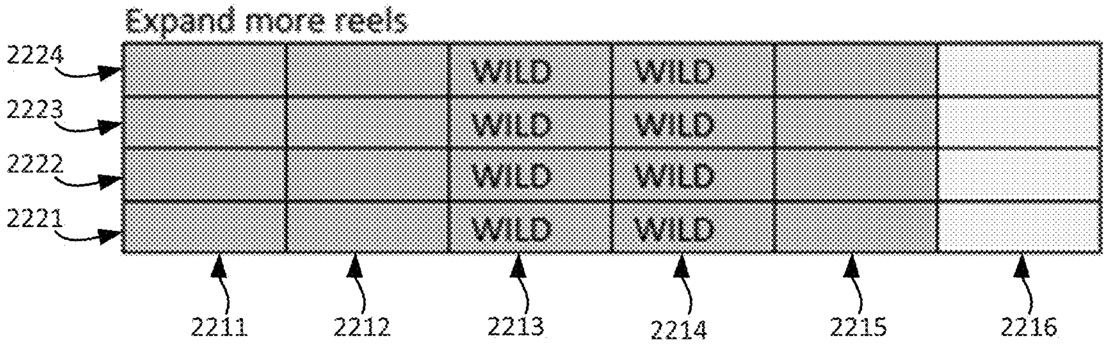

Examples of the addition of one or more symbol positions are illustrated in FIGS. 22A, 22B, 22C. In one example, the symbol positions can be added after defined symbol expands to occupy all symbol positions of a column of symbol positions. In another example, the symbol positions can be added contemporaneously. Adding symbol positions intuitively communicates to the player that there is a chance of a larger award being made by the gaming device.

FIG. 22A shows an arrangement where there is an initial array of symbol positions comprising five columns 2211-2215 and four rows 2221-2224 of symbol positions. FIG. 22A shows an example where two special WILD symbols have landed in the third column 2213 and the fourth column 2214 of symbol positions in a same game instance resulting in WILD symbols populating each of the symbol positions of the third column 2213 and the fourth column 2214.

FIG. 22B illustrates two possible modifications to the array of symbol positions. In one example, three additional rows 2225-2227 of symbol positions are added and WILD symbols are populated to each additional symbol position of the third column 2213 and the fourth column 2214. In another example, symbol positions are only added to the third column 2213 and the fourth column 2214. Such an embodiment is most suited to a ways-to-win game such as games produced by the present applicant that are referred to as "Reel Power" games. In this example, the added symbol position will increase a multiplier applied to winning combinations. In other examples, the number of added symbol positions may be different, e.g. one, two, or four rows of symbol positions. In other examples, the number of added symbol positions may depend on the number of columns populated by a defined symbol, e.g. one row of symbol positions for a first defined symbol, two rows for a second defined symbol, etc.

FIG. 22C illustrates an example where an additional column 2216 of symbol positions is added to the array of FIG. 22A. The additional column of symbol positions provides the opportunity for the processor 204 to make an award for a winning combination featuring six symbols which can be larger than awards for five symbols in the pay table as it is less likely to occur. In such examples, symbols are selected from an additional reel strip to populate the added column 2216.

Figure 32:
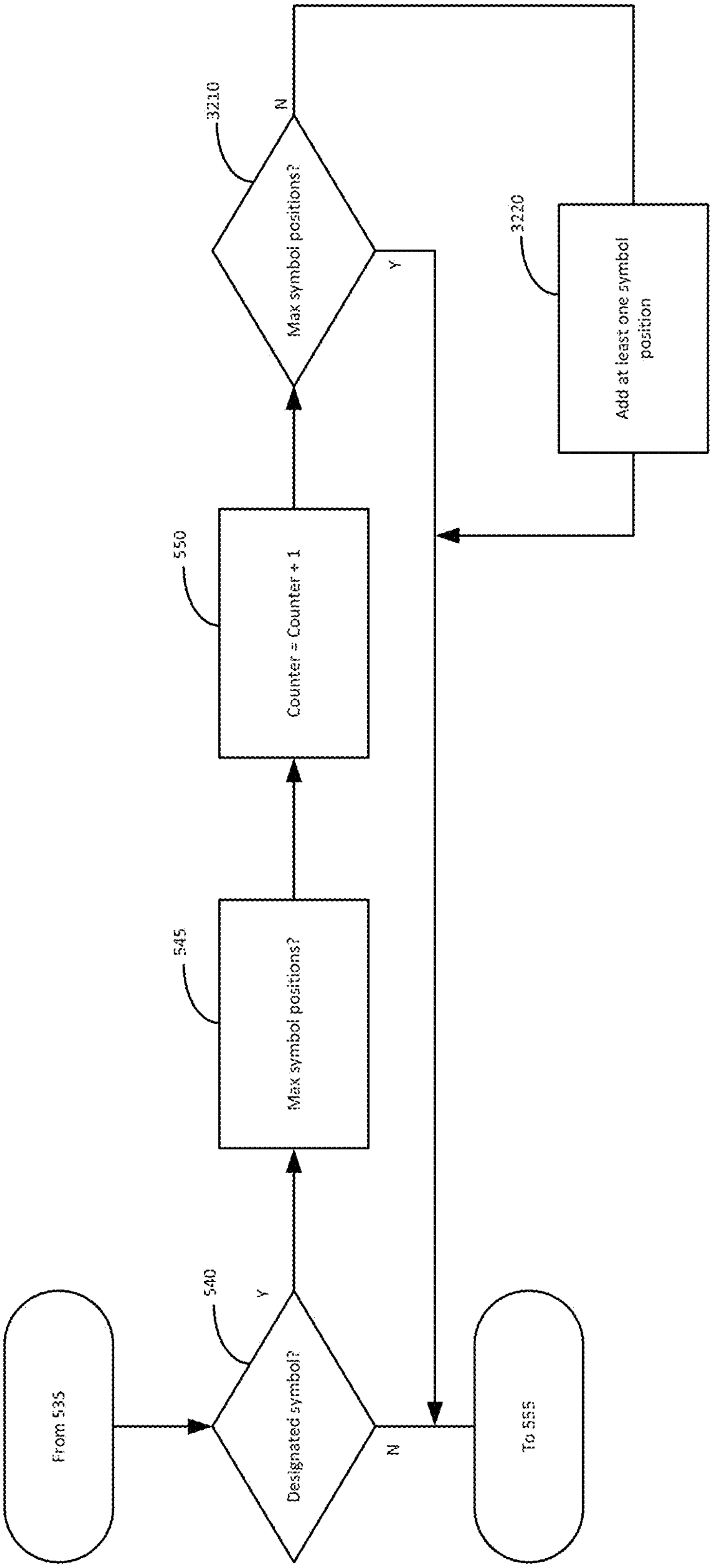
FIGS. 32 and 33 are flow charts illustrating example modifications to the method shown in FIG. 5.

FIG. 32 is a flow chart showing a section of FIG. 5 modified to incorporate the additional functionality of adding one or more symbol positions. FIG. 32 shows that in some examples after awarding the additional free game at step 550, processor 204 determines whether a maximum number of symbol added symbol positions has been reached at step 3210 and if not adds at least one symbol position (e.g. a row of symbol positions) at step 3220. This step is particularly suited where columns of symbols are added and the additional reel strip(s) include(s) the designated symbol. Step 3210 is not needed in examples where additional rows are added as the population of a column with the defined symbol will place a cap on the addition of more rows in a manner analogous to the cap on additional game instances described above.

Figure 33:
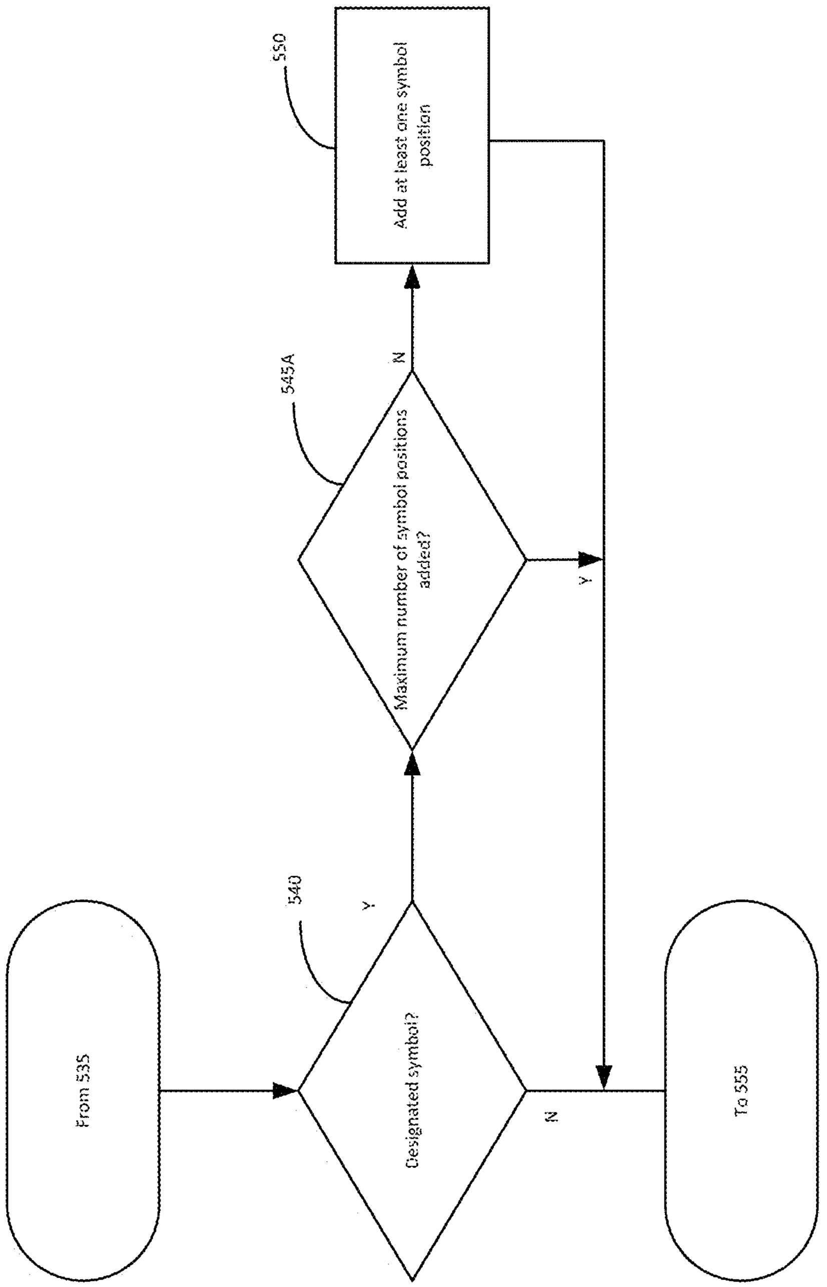

FIG. 33 is a flow chart showing a section of FIG. 5 modified to replace the functionality of adding designated symbols and awarding a free game with the alternative functionality of adding one or more symbol positions responsive to a designated symbol landing. In this example, at step 545A, the processor 204 determines whether a maximum number of added symbol positions has been reached and if not at least one symbol position at step 550.

Figure 23A:
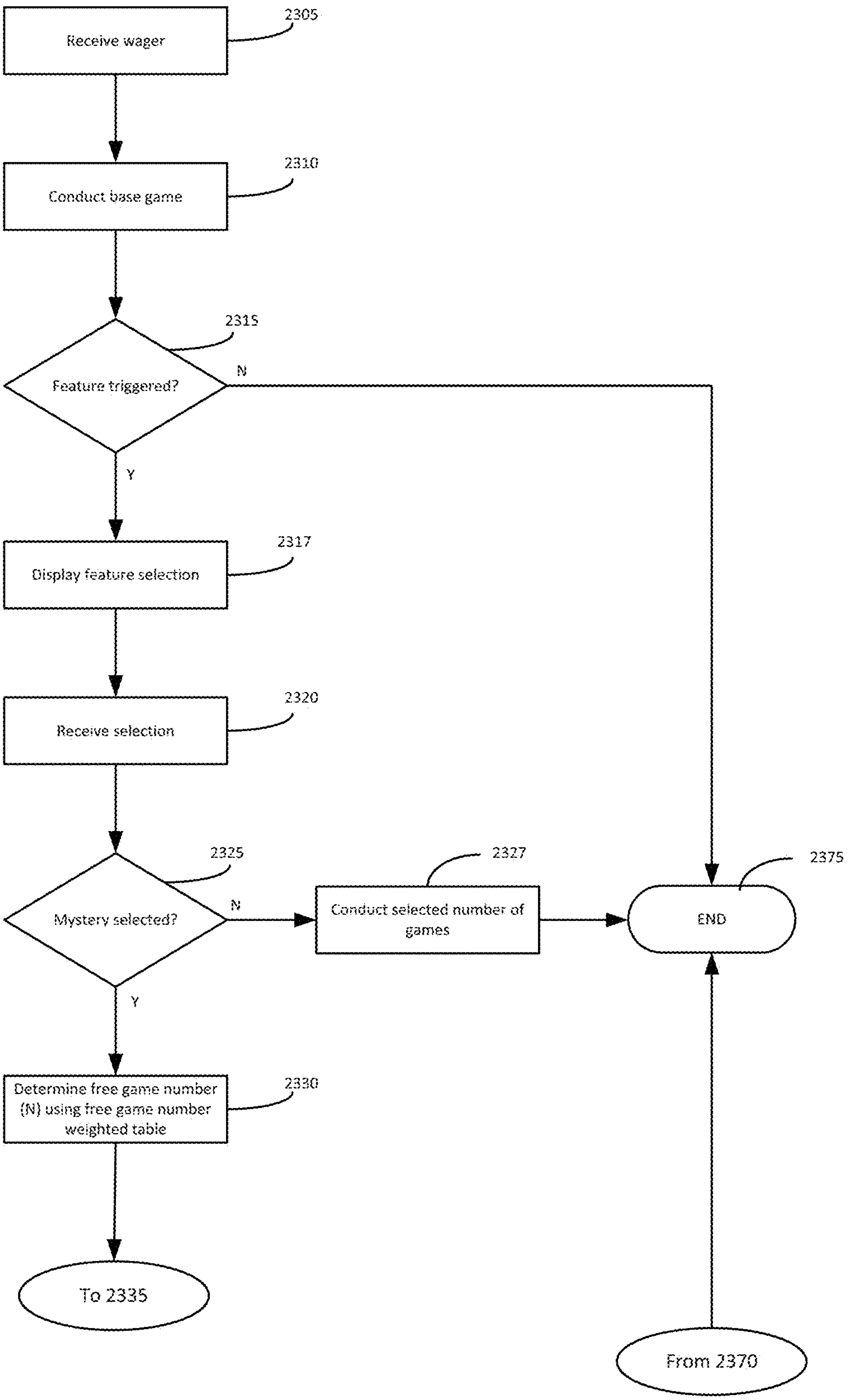
FIGS. 23A and 23B are a flow chart of an alternative method of operating a gaming device.
Figure 23B:
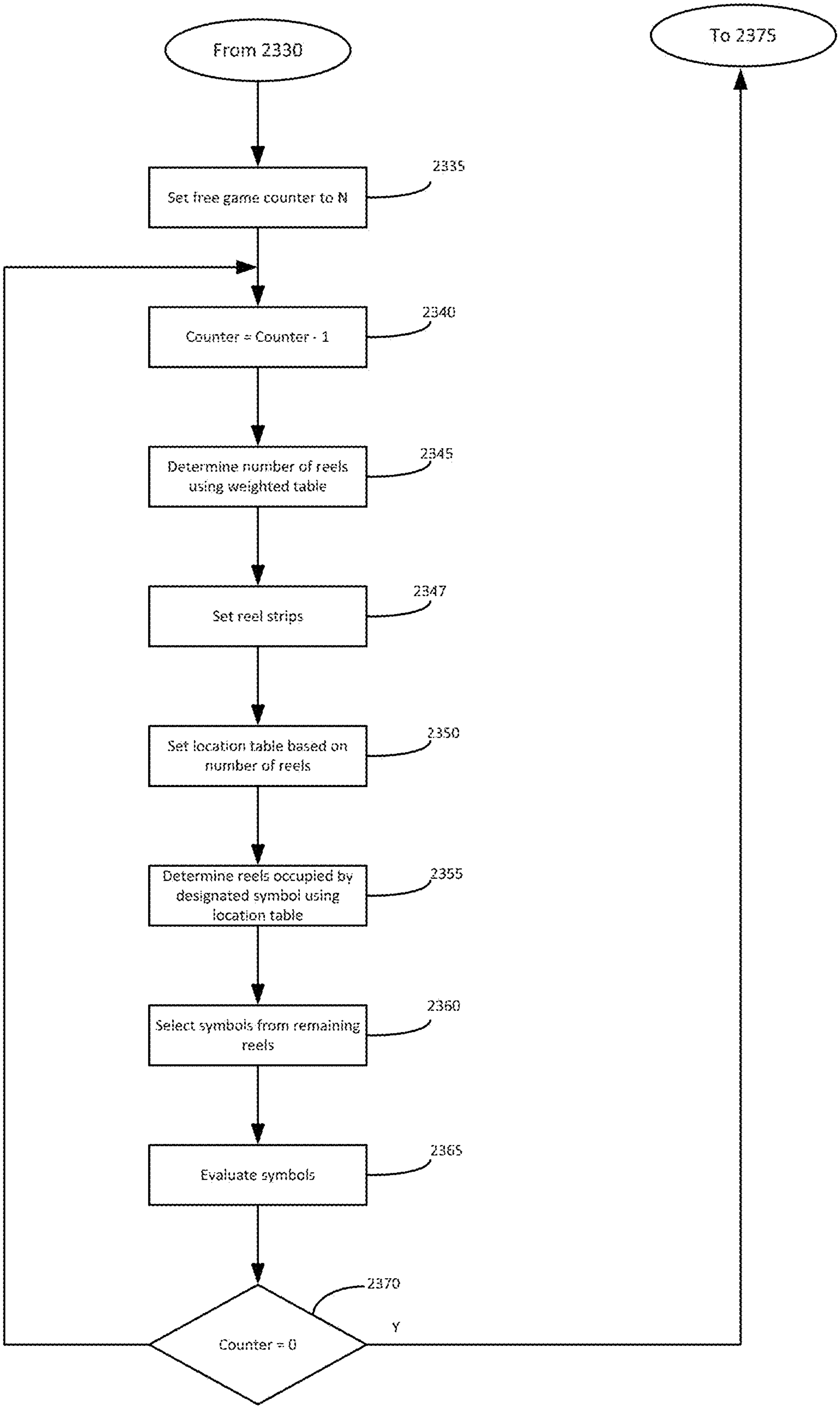

FIGS. 23A and 23B present a flow chart illustrating a method 2300 of operating a gaming device to implement an alternative feature game to that described in relation to FIG. 5 where columns of symbol positions are populated with defined symbols using a different mechanism.

In an example, at step 2305, the gaming device 200 receives a wager selection input by the player using one of the input devices described above.

At step 510, the processor 204 of the gaming device responds to initiation of a game by conducting a base game. To conduct the base game, the processor 204 selects symbols from a set of reel strips stored in memory 208 and evaluates the selected symbols for (i) winning combinations based on a pay table stored in memory 208; and, at step 2315 for (ii) any feature game trigger. In an example, the base game is the same as that described in relation to FIG. 5 above. If no feature game is triggered at step 2315, the processor 204 ends the game at step 2375.

If a feature game is triggered at step 2315, processor 204 controls the display 240 to display a feature game selection screen at step 2317.

Figure 24:
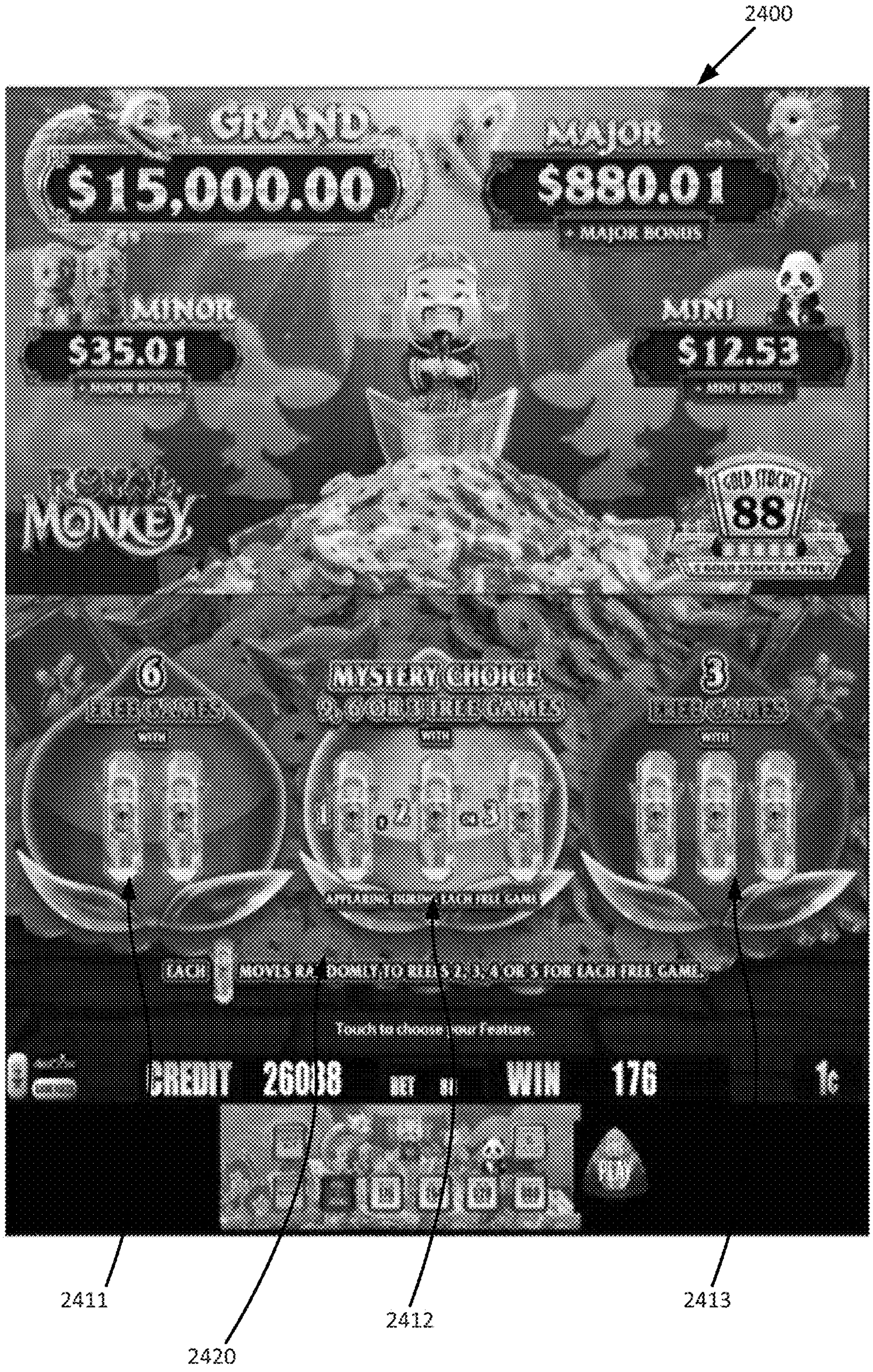
FIGS. 24, 25, 26, 27, 28, 29, 30, and 31 are example screen displays during an example of the alternative method of operating the gaming device.

FIG. 24 shows an example screen display 2400 of a feature game selection screen. In the example, a player is offered three choice icons: a first choice icon 2411 corresponding to a choice where 6 free games are conducted by the processor 204 with two columns of symbol positions occupied by an enlarged WILD symbol (i.e. every symbol position of the column is a WILD symbol); a second "Mystery" choice icon 2412, corresponding to a choice where the processor conducts 9, 6 or 3 free games with 1, 2 or 3 two columns of symbol positions occupied by an enlarged WILD symbol; and a third choice icon 2413 corresponding to a choice where 3 free games are conducted by the processor 204 with three columns of symbol positions occupied by an enlarged WILD symbol. It will be appreciated that in other examples, there may be more or fewer choices.

Message 2420 indicates that "Each [enlarged WILD symbol] moves randomly to reels 2, 3, 4, or 5 for each free game"—i.e. that irrespective of the choice, the reel or reels that have an enlarged WILD symbol will be selected using a mechanism having an element of randomness, an example of which will be described below.

At step 2320, the processor 204 receives a selection (e.g. when a player touches an area of display 240 corresponding to one of choice icons 2411, 2412, 2413).

At step 2325, the processor 204 determines the number (N) of free games to conduct using a free game number weighted table stored in memory 208 and the random number generator (RNG) 212. In one example, the weightings for the three different numbers of free games are even. In another example, the weightings are biased towards awarding 6 free games. In order to determine the result, processor 204 allocates ranges of possible values returnable by the RNG 212 to each of the possible numbers of free game based on the weighted table and when the RNG returns a value, processor 204 compares the returned values to the ranges of possible values in order to determine which number of free games are to be conducted. In other examples, the weighted table may define the allocated ranges.

Figure 25:
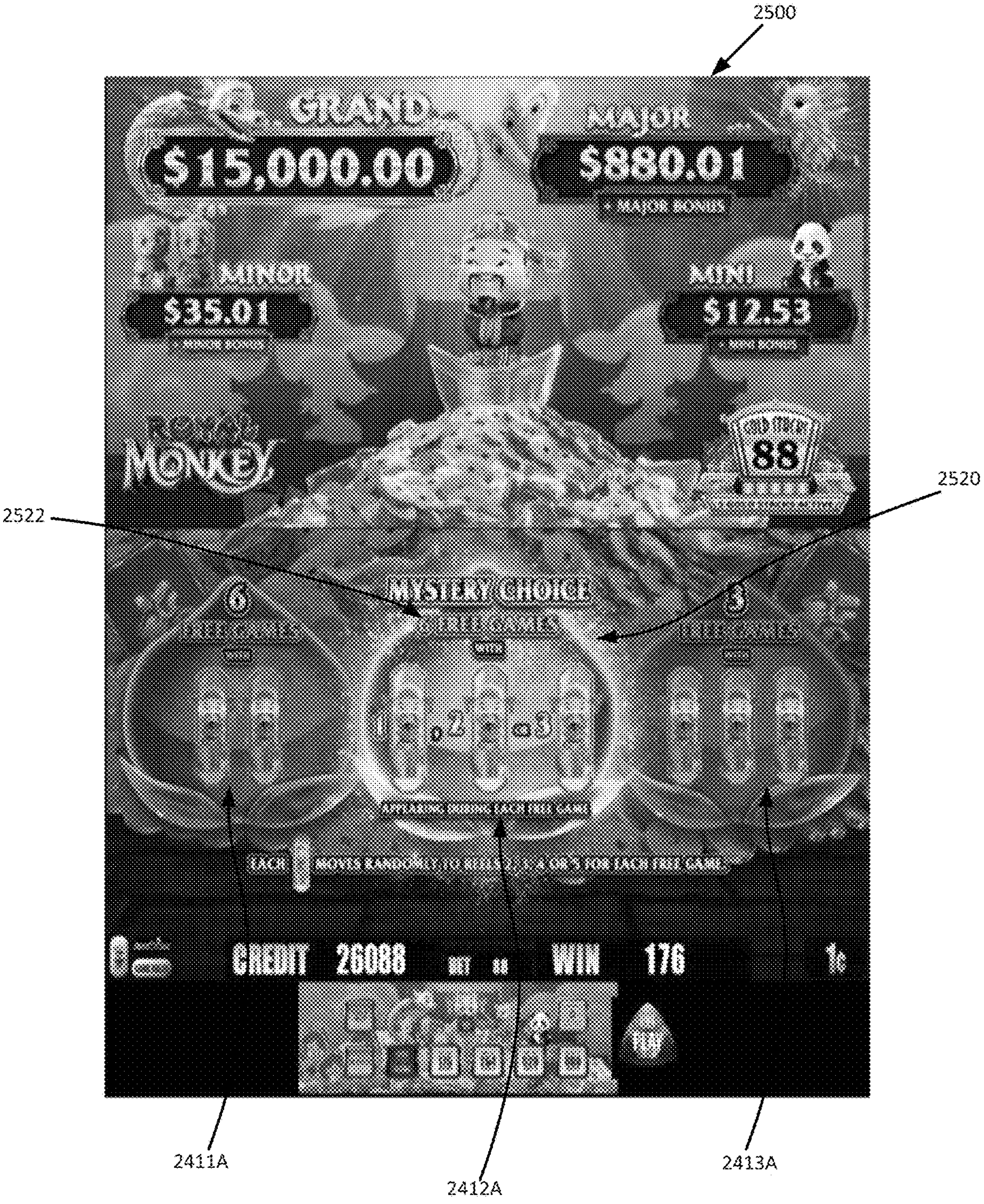

FIG. 25 is an example screen display after steps 2325 and 2330. In this example, animations effects 2520 and updated message 2522 are added to produce a modified second choice icon 2412A that indicates that the player has selected the mystery choice. Greyed out versions of the first choice icon 2411A and the third choice icon 2413A are displayed to make it clear which icon has been selected. The update message 2520 indicates the result of the random determination at step 2330 was "6 free games".

At step 2335, processor 205 sets a counter in memory to the determined number of free games (N). In the example, of FIG. 25, the counter is set to 6.

Processor 204 then executes through an iterative loop comprising steps 2340 to 2370 to conduct the feature games. At step 2340, processor 204 decrements the counter by one.

At step 2345, processor 204 determines the number of reels to be occupied by the enlarged wild symbol (referred to as "tall wilds") in the present free game using a reel number weighted table such as the example of Table 1 below.

TABLE 1

| | 3 free games | 6 free games | 9 free games |
|---|---|---|---|
| 1 tall wild | 0.2 | 0.15 | 0.1 |
| 2 tall wilds | 0.3 | 0.25 | 0.2 |
| 3 tall wilds | 0.5 | 0.6 | 0.7 |

From Table 1, it will be apparent that in this example, the weighted table that is applied is dependent on the number of free games determined at step 2330. That is, processor 204 first selects the portion of Table 1 to use and then determines the number of reels for the current game instance using the portion of the table and the RNG 212.

In an example of the embodiment, the reel strips used for the feature game are dependent on the number of reels occupied by the enlarged wild symbol. Accordingly, at step 2347 the processor selects one of a plurality of sets of reel strips stored in memory 208 as the set of reel strips to be used in this free game based on the outcome of the determination at step 2345.

In an example, the locations at which the enlarged wild symbols will be placed are also dependent on the outcome of the determination at step 2345. In one example, where the outcome is 1 or 2 enlarged wild symbols or "tall wilds", the weighted tables are designed so that all possible placings of the tall wilds in columns 2 to 5 have similar or equal weighting but for three tall wilds, the table is weighted so that tall wilds are more likely to be selected for the fourth and fifth reel. Table 2 is an example of a location table for three enlarged wild symbols.

In Table 2 the states correspond to columns from left to right starting a the second reel with a "1" indicating that if the processor 204 selects this state, the processor 204 will control the display so that an enlarged symbol will populate the respective column of symbol positions while a "0" indicates that there will not be an enlarged symbol in the respective column and symbol will be selected from the reel strip associated with that column. For example, the state "0111" corresponds to enlarged wild symbols in columns 3, 4 and 5, the state "1011" corresponds to enlarged wild symbols in columns 2, 4 and 5, etc.

TABLE 2

| State | Weight |
|---|---|
| 0111 | 35% |
| 1011 | 30% |
| 1101 | 25% |
| 1110 | 10% |

Accordingly, at step 2355 the processor 204 uses weights of Table 2 and the states they correspond in conjunction with RNG 212 to set locations for the enlarged wild symbol and to control the display to display the enlarged wild symbols at the locations set in accordance with the selected step. Similar location tables for each of 1 and 2 enlarged wild symbols are stored in memory 208 for use by the processor 204 at step 2355.

Figure 26:
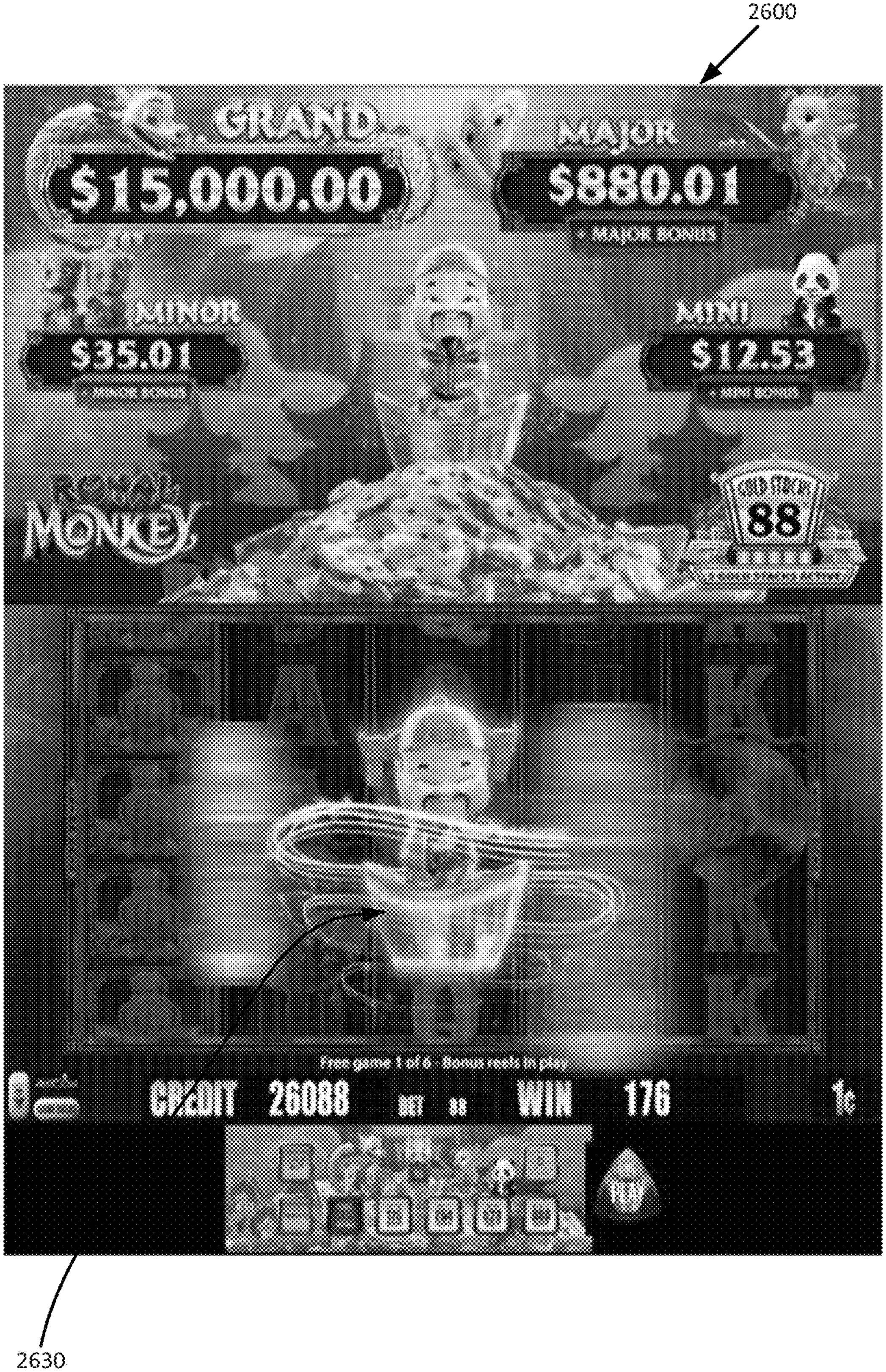

In the respect, as shown in the example screen display 2600 of FIG. 26, to build anticipation, processor 208 controls display 240 to display a transition animation 2630 of the character shown in the enlarged wild symbols to communicate to the player that the number and location of the wild symbols is being determined.

Figure 27:
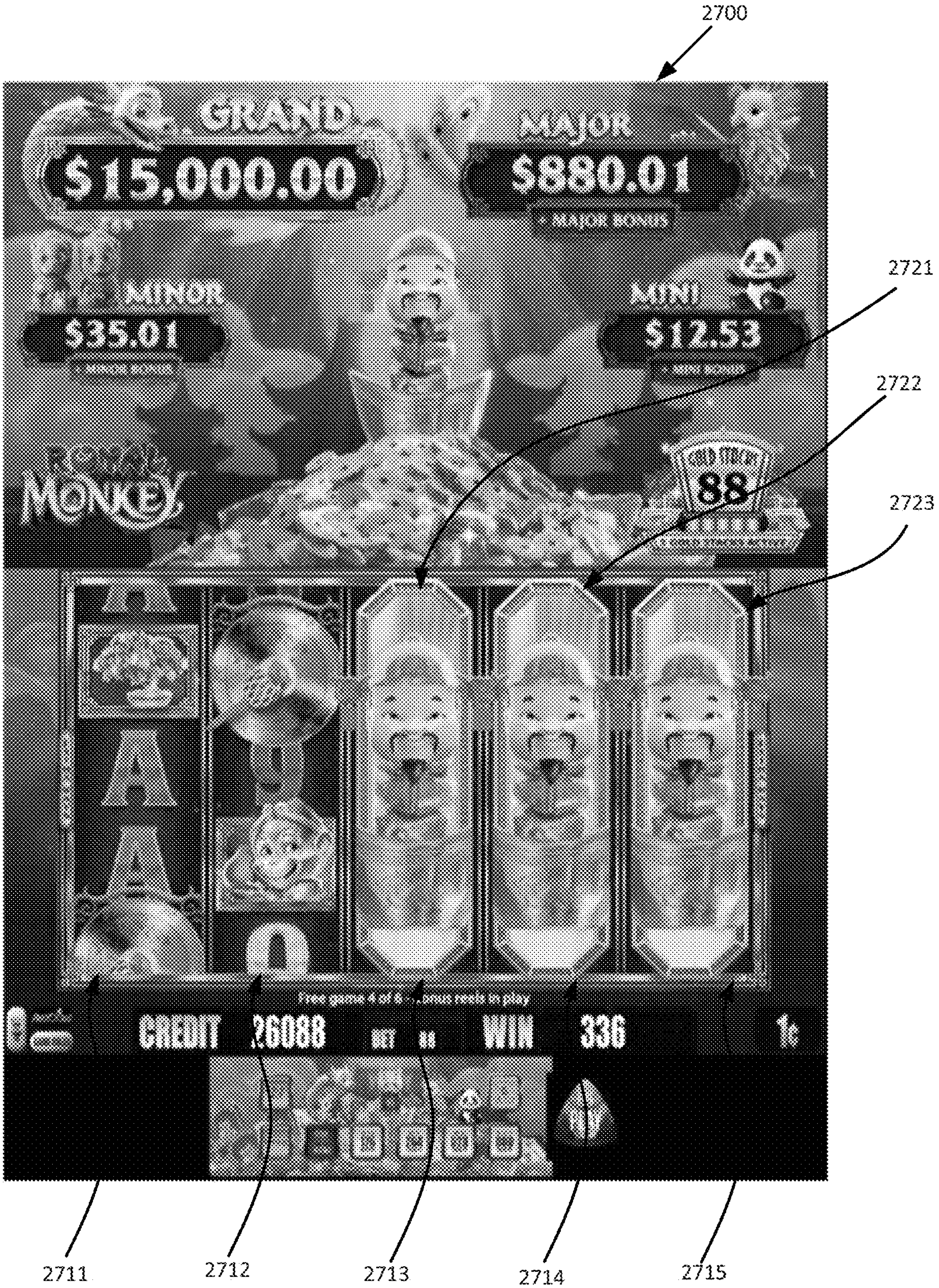

FIG. 27 shows an example screen display where the result of steps 2345-2355 is that the processor 204 has set the third column 2713, fourth column 2714, and fifth column 2715 of five columns 2711-2715 to be occupied by enlarged wild symbols 2721, 2722, 2723. In the example, after the transition animation 2630 is removed and the number and location of the enlarged reel strips are revealed (as in FIG. 27), the processor 204 controls display of the remaining columns (here the first column 2711 and the second column 2712) to initially display the associated reel strips as spinning relative to the symbol positions.

At step 2360, processor 204 selects symbols for the remaining columns of symbol positions from their associated remaining reel strips. In this respect, as with FIG. 5, the selection may be performed by processor 204 using a modified version of the process of FIG. 4 in order to select symbols from the reel strips for columns of symbol positions unpopulated by the enlarged WILD symbols. In one implementation, following step 420, the processor 204 determines whether the column is occupied by the defined symbol and, if the column is populated, reverts to step 420 rather than proceeding to step 430 so that the reel strip number is incremented again. In one implementation in order to enable a determination of whether a column is populated, processor 204 sets a current state of each column in memory 208 as part of step 2355.

Figure 28:
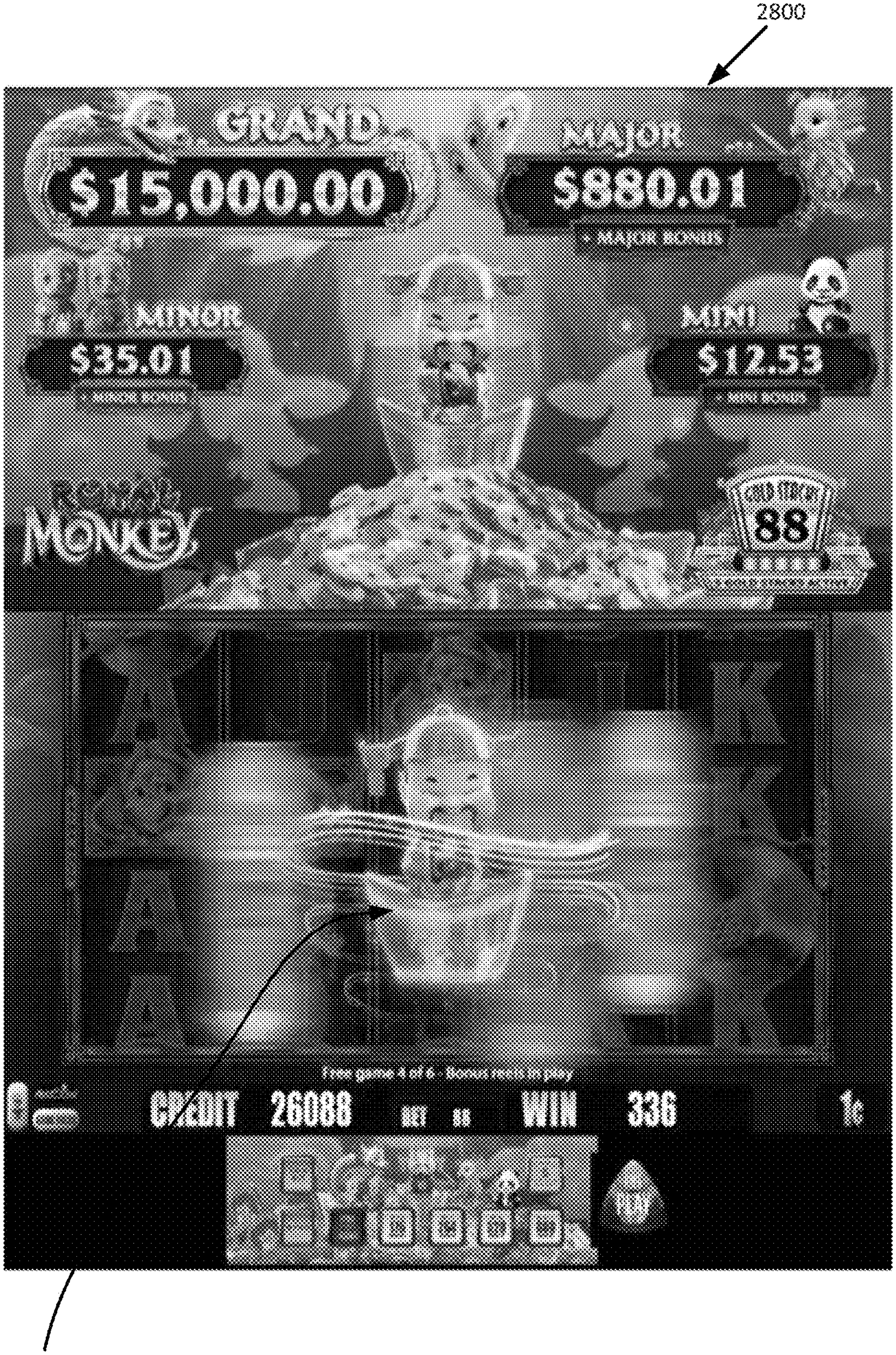

FIG. 28 is an example screen display 2800 that illustrates that a transition animation 2630 is displayed for each free game of the series of free game instances.

Figure 29:
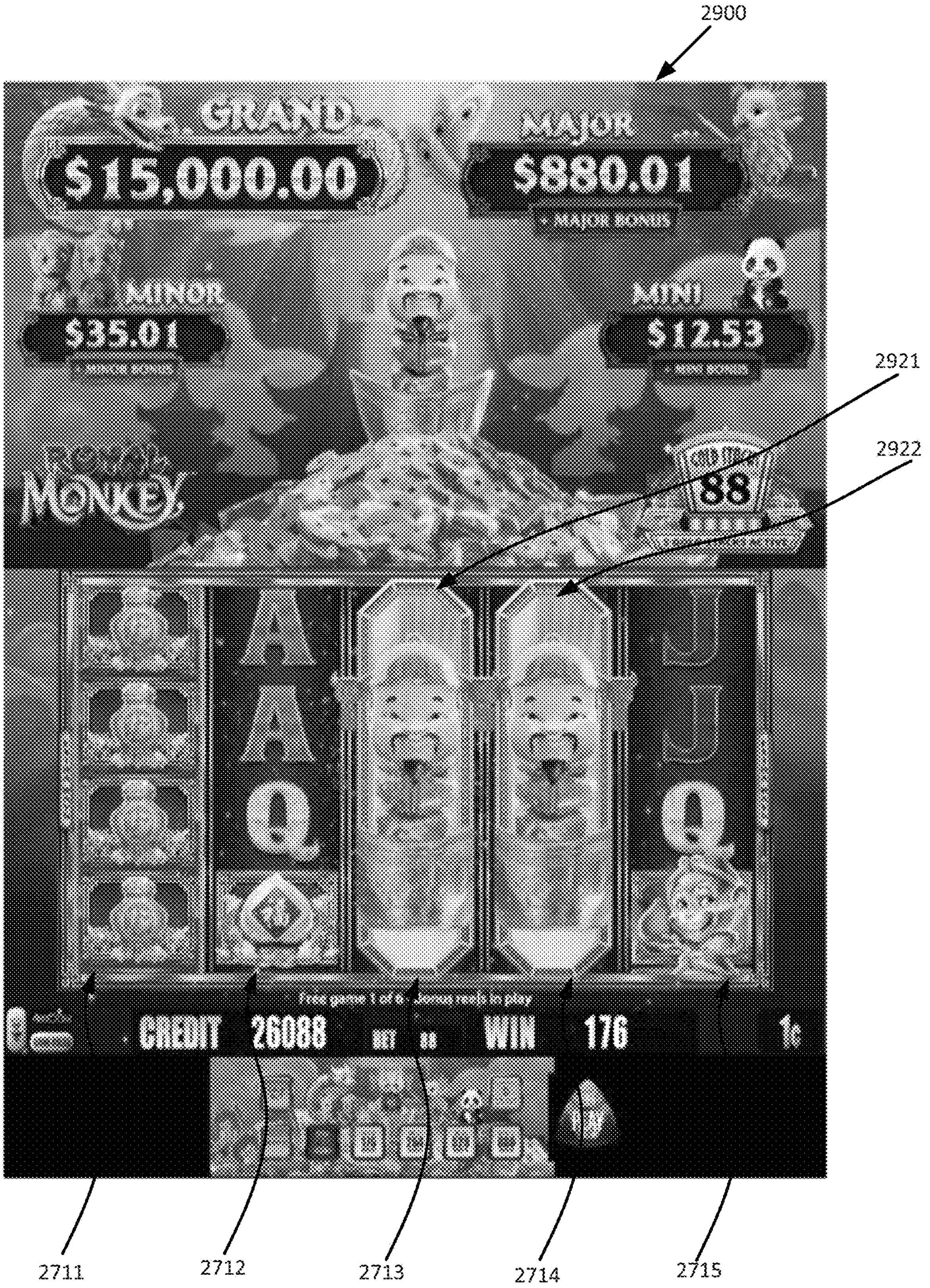

FIG. 29 is an example screen display 2900 showing the result of steps 2345-2360 in a case where processor 204 has set the third column 2713 and the fourth column 2714 to be occupied by enlarged wild symbols 2921, 2922 and has selected symbols for the first column 2711, the second column 2712, and the fifth column 2715.

Figure 30:
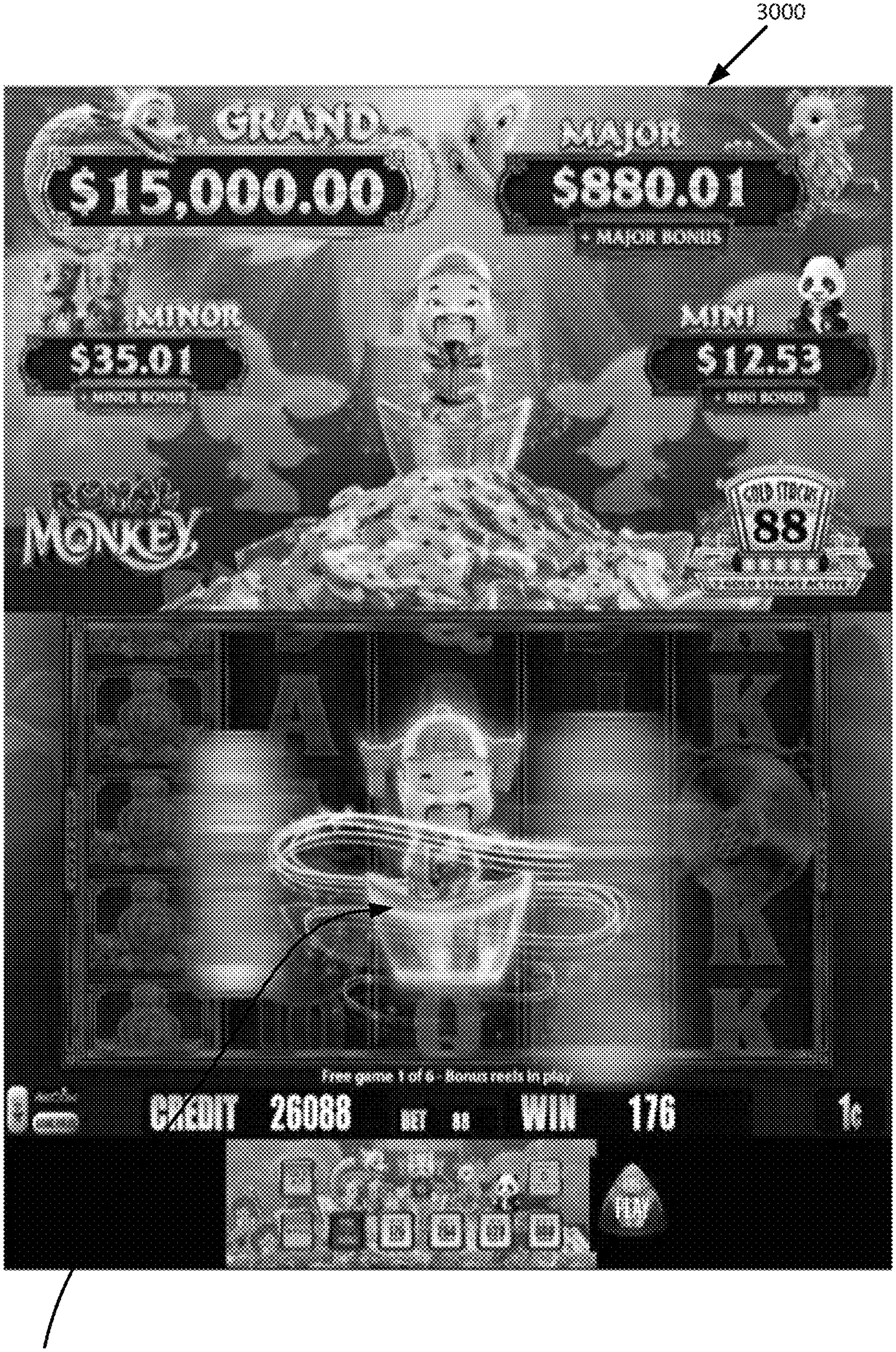

FIG. 30 is a further example screen display 3000 of a transition animation 2630 for a further free game.

Figure 31:
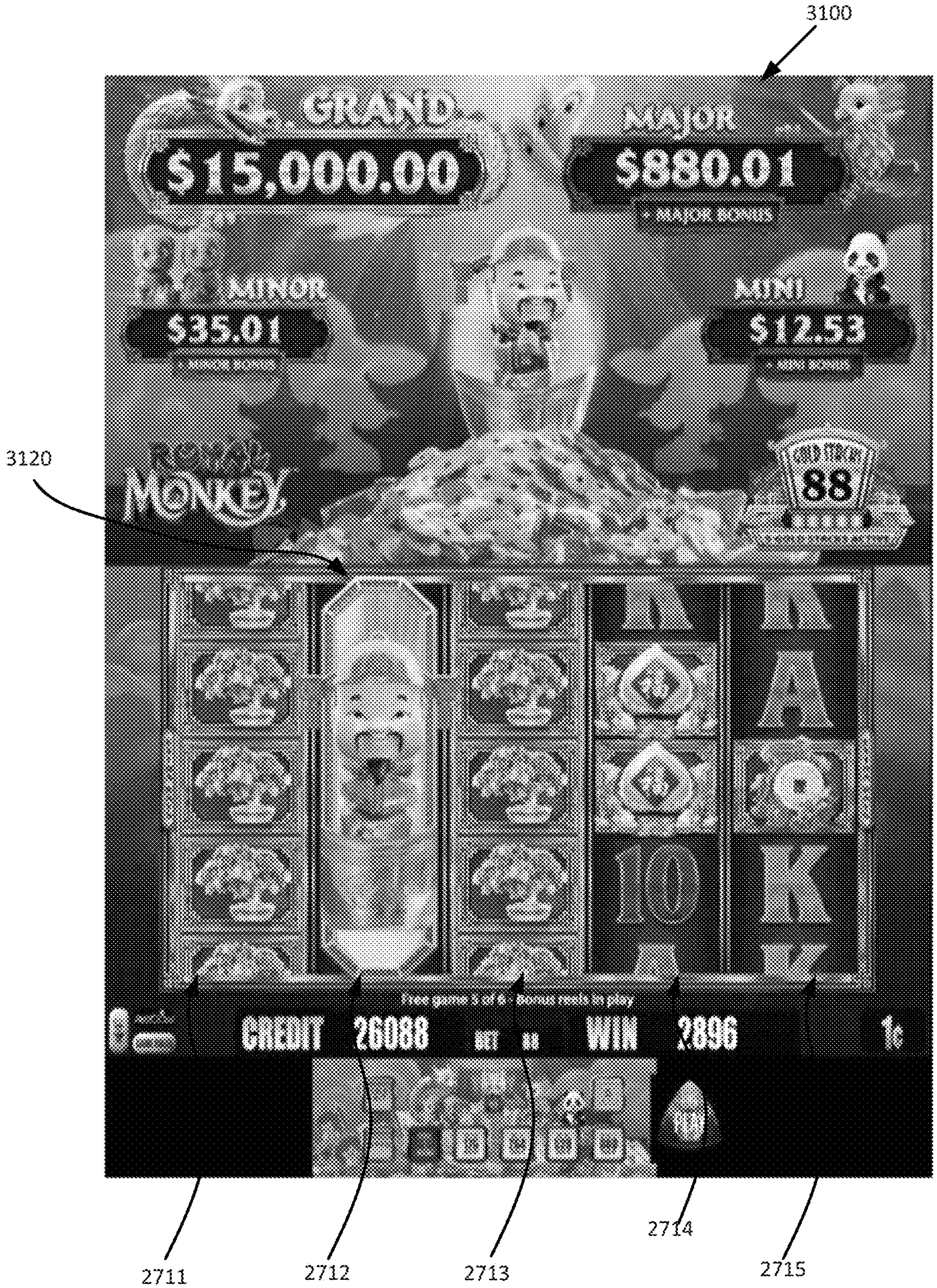

FIG. 31 is a further example screen display 2900 showing the result of steps 2345-2355 in a case where processor 204 has set the second column 2712 to be occupied by an enlarged wild symbol 3120.

Accordingly, it will be appreciated that in the embodiment, each game instance of the free games creates anticipation as to the number of columns that will be populated by a defined symbol.

If at step 2325, processor 204 determines whether the selection is not the mystery choice 2412 and processor 204 proceed to step 2327 and conducts the selected number of free games. In this respect, it will be appreciated that conducting the selected number of free games will involve a similar iterative loop (not shown) to that of the mystery jackpot but modified to take into account that the number of oversized symbols is fixed.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A method of operating a gaming device, the gaming device having a processor and a memory storing a plurality of reel strips corresponding to a plurality of columns of symbol positions, a defined symbol, a weighted table having a plurality of weights defining relative probabilities of a plurality of different numbers of columns to be populated by the defined symbol, the method comprising:

causing a display device of the gaming device to animate a number of game instances based on at least one random number generated by a random number generator, responsive to a condition being met;

for each game instance of the number of game instances selected, determining a number of columns of symbol positions to be populated by the defined symbol selected from the plurality of different numbers of columns based at least in part on the random number generator and the plurality of weights in the weighted table;

visually animating at the display device the defined symbol oversizing into a first oversized defined symbol to occupy a first column of symbol positions among the number of columns of symbol positions selected for a current game instance and at least one subsequent game instance, and a plurality of symbols populating the columns of symbol positions unoccupied by the first oversized defined symbol from the plurality of reel strips corresponding to the columns of symbol positions unoccupied by the first oversized defined symbol based on the random number generator;

responsive to a second column of symbol positions being displayed adjacent the first column of symbol positions displaying a second oversized defined symbol, visually animating the first oversized defined symbol combining with the second oversized defined symbol to form a third oversized defined symbol occupying both the first column of symbol positions and the second column of symbol positions; and animating an award on the display device evaluated from the third oversized defined symbol and the plurality of symbols selected for the columns of symbol positions unoccupied by the third oversized defined symbol.

2. The method of claim 1, wherein the weighted table further comprises a plurality of different sets of weights associated with respective ones of a different numbers of game instances, and further comprising randomly selecting the number of columns of symbol positions based on the plurality of weights associated with the number of game instances selected.

3. The method of claim 1, further comprising incrementing the number of game instances when the plurality of symbols selected include the defined symbol.

4. The method of claim 1, wherein each column among the number of columns of symbol positions includes a predetermined plurality of symbol positions, and further comprising visually changing each symbol position of the predetermined plurality of symbol positions unpopulated with the defined symbol when one symbol position of the predetermined plurality of symbol positions includes the defined symbol, prior to occupying the number of columns of symbol positions with any oversized defined symbol.

5. The method of claim 1, further comprising determining that the condition is met when one or more of the columns of symbol positions include the defined symbol.

6. The method of claim 5, further comprising defining the number of game instances based on the one or more of the columns of symbol positions that include the defined symbol.

7. The method of claim 5, further comprising displaying at least one additional column of symbol positions when one or more of the columns of symbol positions include the defined symbol.

8. A gaming device comprising:

a display;

a processor; and a memory storing a) a plurality of reel strips for use when one or more game instances are awarded, the plurality of reel strips corresponding to a plurality of columns of symbol positions, each reel strip of a subset of the plurality of reel strips comprising a designated symbol, and each of the plurality of columns of symbol positions having a plurality of symbol positions, and b) instructions, which, when executed, cause the processor to at least:

responsive to an award condition being met, award a plurality of game instances initially, for a current game instance of the plurality of game instances initially awarded:

animate on the display a plurality of symbols selected from the plurality of reel strips populating the plurality of columns of symbol positions not populated with the designated symbol, based on a random number generated by a random number generator, responsive to the designated symbol being selected for one symbol position in one column of symbol positions on the display, animate all symbol positions in the one column of symbol positions being populated with the designated symbol, prior to evaluation, for the current game instance and at least one remaining game instance, responsive to a second column of symbol positions adjacent to the one column of symbol positions having been populated with a second designated symbol, animate the designated symbol combining with the second designated symbol to form a third designated symbol occupying both the one column of symbol positions and the second column of symbol positions, display an award at least one additional game instance and cap a total number of additional game instances to be awarded during the game instances with the game instances initially awarded, a number of reel strips having the designated symbol, and the additional game instances awarded in the current game instance, and evaluate the plurality of symbols selected for the columns of symbol positions unoccupied by the third designated symbol and the third designated symbol displayed in the current game instance for winning combinations.

9. The gaming device of claim 8, wherein the instructions, when executed, cause the processor to define a game counter based on the plurality of game instances initially awarded, increment the game counter upon an additional game instance being awarded, decrement the game counter for each of the plurality of game instances conducted, and end the plurality of game instances when the game counter reaches zero.

10. The gaming device of claim 8, wherein the instructions, when executed, cause the processor to conduct a base game and monitor the base game to determine whether the award condition is met.

11. The gaming device of claim 8, wherein the designated symbol is a wild symbol.

12. The gaming device of claim 8, wherein the instructions, when executed, cause the processor to add at least one symbol position to the plurality of columns of symbol positions responsive to selecting the designated symbol for one of the plurality of columns of symbol positions.

13. The gaming device of claim 12, wherein the instructions, when executed, cause the processor to add the at least one symbol position adjacent each symbol position of the plurality of columns of symbol positions.

14. The gaming device of claim 12, wherein the instructions, when executed, cause the processor to control the display to oversize the designated symbol to occupy the columns of symbol positions.

15. A non-transitory computer-readable medium comprising instructions, which, when executed, cause a processor to perform the steps of:

responsive to an award condition being displayed on a display device at a gaming device, initiating a display via the display device of the gaming device of a plurality of game instances initially; and for a current game instance of the plurality of game instances initially awarded:

controlling the display device to animate a plurality of symbols selected from a plurality of reel strips populating a plurality of columns of symbol positions not populated with a designated symbol, based on a random number generated by a random number generator, responsive to the designated symbol being selected for one symbol position in one column of symbol positions on the display device, animating all symbol positions in the one column of symbol positions being populated with the designated symbol, prior to evaluation, for the current game instance and at least one remaining game instance, responsive to a second column of symbol positions adjacent to the one column of symbol positions having been populated with a second designated symbol, animating the designated symbol combining with the second designated symbol to form a third designated symbol occupying both the one column of symbol positions and the second column of symbol positions, animating an award at least one additional game instance and cap a total number of additional game instances to be awarded during the game instances with the game instances initially awarded, a number of reel strips having the designated symbol, and the additional game instances awarded in the current game instance, and evaluating the plurality of symbols selected for the columns of symbol positions unoccupied by the third designated symbol and the third designated symbol displayed in the current game instance for winning combinations.

16. The non-transitory computer-readable medium of claim 15, wherein the instructions, when executed, cause the processor to perform the step of defining a game counter based on the plurality of game instances initially awarded, incrementing the game counter upon an additional game instance being awarded, decrementing the game counter for each of the plurality of game instances conducted, and ending the plurality of game instances when the game counter reaches zero.

17. The non-transitory computer-readable medium of claim 15, wherein the instructions, when executed, cause the processor to perform the step of conducting a base game and monitor the base game to determine whether the award condition is met.

18. The non-transitory computer-readable medium of claim 15, wherein the instructions, when executed, cause the processor to perform the step of adding at least one symbol position to the plurality of columns of symbol positions responsive to selecting the designated symbol for one of the plurality of columns of symbol positions.

19. The non-transitory computer-readable medium of claim 18, wherein the instructions, when executed, cause the processor to perform the step of adding the at least one symbol position adjacent each symbol position of the plurality of columns of symbol positions.

20. The non-transitory computer-readable medium of claim 18, wherein the instructions, when executed, cause the processor to perform the step of controlling the display device to oversize the designated symbol to occupy the columns of symbol positions.

* * * * *